United States Patent
Kim et al.

(10) Patent No.: US 9,428,055 B2
(45) Date of Patent: Aug. 30, 2016

(54) VEHICLE, TERMINAL COMMUNICATING WITH THE VEHICLE, AND METHOD OF CONTROLLING THE VEHICLE

(71) Applicant: HYUNDAI MOTOR COMPANY, Seoul (KR)

(72) Inventors: Juhyuk Kim, Seongnam-si (KR); Juhyun Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/559,867

(22) Filed: Dec. 3, 2014

(65) Prior Publication Data

US 2015/0321557 A1 Nov. 12, 2015

(30) Foreign Application Priority Data

May 8, 2014 (KR) .................. 10-2014-0054816

(51) Int. Cl.
*G06K 19/06* (2006.01)
*B60K 35/00* (2006.01)
*G07C 5/08* (2006.01)

(52) U.S. Cl.
CPC .............. *B60K 35/00* (2013.01); *G07C 5/08* (2013.01); *B60K 2350/352* (2013.01)

(58) Field of Classification Search
USPC ................ 235/494, 375, 487, 476
See application file for complete search history.

(56) References Cited

U.S. PATENT DOCUMENTS

| | | | |
|---|---|---|---|
| 2005/0222726 A1* | 10/2005 | Furui et al. ................. 701/36 | |
| 2007/0021057 A1* | 1/2007 | Arseneau ............ G06F 1/1626 | 455/3.06 |
| 2007/0265745 A1* | 11/2007 | Styles et al. .................... 701/36 | |
| 2010/0241857 A1 | 9/2010 | Okude | |
| 2011/0195699 A1* | 8/2011 | Tadayon et al. ............... 455/418 | |
| 2012/0148117 A1* | 6/2012 | Chang ........................... 382/118 | |
| 2013/0127608 A1* | 5/2013 | Ishikawa ............... B60K 37/02 | 340/425.5 |
| 2013/0216102 A1* | 8/2013 | Ryan et al. .................... 382/105 | |
| 2014/0112554 A1* | 4/2014 | Chiu et al. .................... 382/118 | |
| 2014/0222298 A1* | 8/2014 | Gurin .............................. 701/49 | |
| 2014/0285666 A1* | 9/2014 | O'Connell ............... B60R 1/00 | 348/148 |

FOREIGN PATENT DOCUMENTS

| | | |
|---|---|---|
| JP | 2000-272376 A | 10/2000 |
| JP | 2005-074998 A | 3/2005 |
| JP | 2007-286913 A | 11/2007 |
| KR | 10-0772609 A | 10/2007 |
| KR | 10-2012-0006312 A | 1/2012 |
| KR | 10-2012-0056050 A | 6/2012 |
| KR | 10-2013-0127523 A | 11/2013 |

OTHER PUBLICATIONS

Korean Office Action issued in Korean Application No. 2015-016594748 dated Mar. 11, 2015.
Korean Decision on Grant dated Aug. 31, 2015 issued in Korean Patent Application No. 10-2014-0054816 (partial English translation).

* cited by examiner

*Primary Examiner* — Edwyn Labaze
(74) *Attorney, Agent, or Firm* — McDermott Will & Emery LLP

(57) ABSTRACT

A vehicle includes a display unit, and a controller configured to control the display unit to display user identification information such as an emblem and a signature, as an intro image. A user thereby can feel a sense of pride and ownership in his/her own vehicle, and develop a sense of attachment and brand loyalty for his/her own vehicle.

24 Claims, 23 Drawing Sheets

VEHICLE, TERMINAL COMMUNICATING WITH THE VEHICLE, AND METHOD OF CONTROLLING THE VEHICLE

CROSS-REFERENCE TO RELATED APPLICATION

This application claims the benefit of Korean Patent Application No. 2014-0054816, filed on May 8, 2014 in the Korean Intellectual Property Office, the disclosure of which is incorporated herein by reference.

BACKGROUND

1. Field

Embodiments of the present disclosure relate to a vehicle of displaying a user's unique information, a terminal of communicating with the vehicle, and a method of controlling the vehicle.

2. Description of the Related Art

In general, a vehicle has additional functions for a user's convenience, such as an audio play function, a video play function, a navigation function, Heating, Ventilation, and Air-Conditioning (HVAC) control, seat position control, lighting control, etc., in addition to a driving function.

Also, the vehicle includes an instrument panel to display driving information. The instrument panel displays driving information according to a driving state or a peripheral situation using a Driver Information System (DIS) such that a driver can easily understand the driving information.

The instrument panel generally includes a tachometer, a speedometer, a thermometer, and a fuel gauge, and represents information on Revolutions Per Minute (RPM) of engine speed, driving speed, temperature of cooling water, and amount of oil, etc., sensed by sensors, through indicators.

The driver can recognize information about the speed of the driving vehicle by reading a numeral indicated by the corresponding indicator, and adjust driving speed with reference to the information.

The instrument panel is of an analog type or a digital type panel.

Since a digital-type instrument panel can change use of a display screen, it can display any kind of information in addition to meter information. However, many users use a digital-type instrument panel as it is when produced by an automaker.

If a user uses an analog-type instrument panel or a digital-type instrument panel as it is when produced by an automaker, the user can neither show distinct features of his/her own vehicle nor display desired information according to his/her convenience.

SUMMARY

Therefore, it is an aspect of the present disclosure to provide a terminal with provision for receiving a signature and transmitting the signature to a vehicle.

It is another aspect of the present disclosure to provide a vehicle with provision for displaying user identification information such as a signature received from a terminal, and a method of controlling the vehicle accordingly.

It is another aspect of the present disclosure to provide a vehicle with provision for displaying a signature input to an input unit, and a method of controlling the vehicle accordingly.

It is another aspect of the present disclosure to provide a vehicle of deleting a stored signature, changing a stored signature to another signature, and adding a new signature, and a method of controlling the vehicle accordingly.

Additional aspects of the disclosure will be set forth in part in the description which follows and, in part, will be obvious from the description, or may be learned by practice of the disclosure.

In accordance with one aspect of the present disclosure, a vehicle includes: a display unit; and a controller configured to control the display unit to display user identification information.

The vehicle may further include a communication unit configured to communicate with an external terminal, wherein the controller may receive user identification information transmitted from the external terminal.

The user identification information may include at least one of a signature and a picture.

The vehicle may further include an input unit configured to receive user identification information, wherein the controller may register the received user identification information.

The input unit may include a touch pad installed in a navigation system, a touch pad installed in a digital-type instrument panel, or a touch pad installed in an arm rest.

The input unit may include a plurality of up, down, left, and right direction buttons, or a joystick, which is installed in an arm rest The vehicle may further include: an input unit configured to receive an identification number; and a storage unit configured to store the identification number, and user identification information matching the identification number, wherein the controller may search for the user identification information matching the identification number, and control the display unit to display the user identification information.

The storage unit may store driving position information matching the identification number, and the controller may search for the driving position information matching the identification number, and control a position of at least one of a seat, a mirror, and a wheel steering based on the driving position information.

The vehicle may further include a storage unit configured to store an emblem, wherein the controller may control the display unit to display the emblem.

The controller may control the display unit to display the emblem and the user identification information sequentially.

The vehicle may further include an input unit configured to receive information on difference between a time at which the emblem is displayed and a time at which the user identification information is displayed.

The input unit may receive information on locations and sizes of the user identification information and the emblem, and the controller may change designs of the user identification information and the emblem based on the locations and sizes of the user identification information and the emblem, and store the changed designs of the user identification information and the emblem.

The input unit may receive a background image of the display unit on which the user identification information and the emblem are to be displayed, wherein the background image of the display unit is selected by a user, and the controller may control the display unit to display the background image when controlling the display unit to display the user identification information and the emblem.

The vehicle may further include an input unit configured to receive a command among a command for registering the user identification information, a command for deleting the user identification information, a command for changing the user identification information, and a command for adding the user identification information, wherein the controller may register, delete, change, or add the user identification information based on a command received through the input unit.

The display unit may be a digital-type instrument panel, a display unit of an analog-type instrument panel, a window glass installed at a location on which an image from a Head Up Display (HUD) is projected, or a display unit of a navigation system.

The vehicle may further include a communication unit configured to receive an image, wherein the controller may perform image processing on the received image to recognize a signature, and register the recognized signature as user identification information.

In accordance with another aspect of the present disclosure, a terminal communicating with a vehicle includes: a communication unit; a storage unit configured to store user identification information; and a controller configured to control the communication unit to transmit the user identification information to the vehicle.

The user identification information may include a signature, and the terminal may further include an input unit configured to receive the signature.

The terminal may further include an image acquiring unit configured to acquire an image of a subject on which a signature is written, wherein the controller may control transmission of the acquired image.

The terminal may further include an image acquiring unit configured to acquire an image of a subject on which a signature is written, wherein the controller may perform image processing on the image to recognize the signature, and control transmission of the recognized signature.

In accordance with another aspect of the present disclosure, a method of controlling a vehicle with a display unit includes: determining whether there is stored user identification information; and, if it is determined that there is stored user identification information, displaying the user identification information on the display unit.

Determining of whether there is the stored user identification information may include determining whether there is stored user identification information when the ignition is turned on.

The method may further include: communicating with an external terminal; and receiving user identification information from the external terminal, and storing the user identification information.

The method may further include: receiving signature information of the user identification information through an input unit; and storing the signature information.

The method may further include: receiving an identification number; searching for user identification information matching the identification number; and displaying the found user identification information.

The method may further include searching for driving position information matching the identification number, and controlling a position of at least one of a seat, a mirror, and a wheel steering based on the driving position information.

The method may further include additionally displaying an emblem when the user identification information is displayed.

The method may further include sequentially displaying an emblem and user identification information on the display unit.

The method may further include: determining whether a command among a command for registering a signature, a command for deleting a signature, a command for changing a signature, and a command for adding a signature is received from the user identification information; deleting a signature selected by a user if the received command is a command for deleting a signature, requesting the user to input a signature if the received command is a command for registering a signature, deleting a signature selected by the user and requesting the user to input a signature if the received command is a command for changing a signature, and requesting the user to input a signature and an identification number if the received command is a command for adding a signature; and registering or changing and storing, if the signature is input, the signature based on the received command, matching, if the signature and the identification number are input, the input signature with the input identification number, and additionally storing the signature matching the identification number.

The method may further include: performing, if an image is received from an external terminal, image processing on the received image to recognize a signature; and storing the recognized signature as user identification information.

The method may further include, if information about locations, sizes, and display times of a background, an emblem, and user identification information is received after a design change command is received, changing designs of the user identification information and the emblem based on the locations, the sizes, and the display times of the background, the emblem, and the user identification information, and storing the changed designs of the user identification information and the emblem.

In accordance with another aspect of the present disclosure, there is provided a vehicle having an instrument panel, wherein the instrument panel may include: a display unit configured to display meter information; and a controller configured to control the display unit to display a users signature.

The controller may control the display unit to display the user's signature and an emblem if the ignition is turned on, and control the display unit to display the meter information when a predetermined time period has elapsed from when the user's signature and the emblem have been displayed.

The controller may register a signature received from an external terminal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, the present disclosure will be described in detail with reference to the accompanying drawings.

Figure 1:
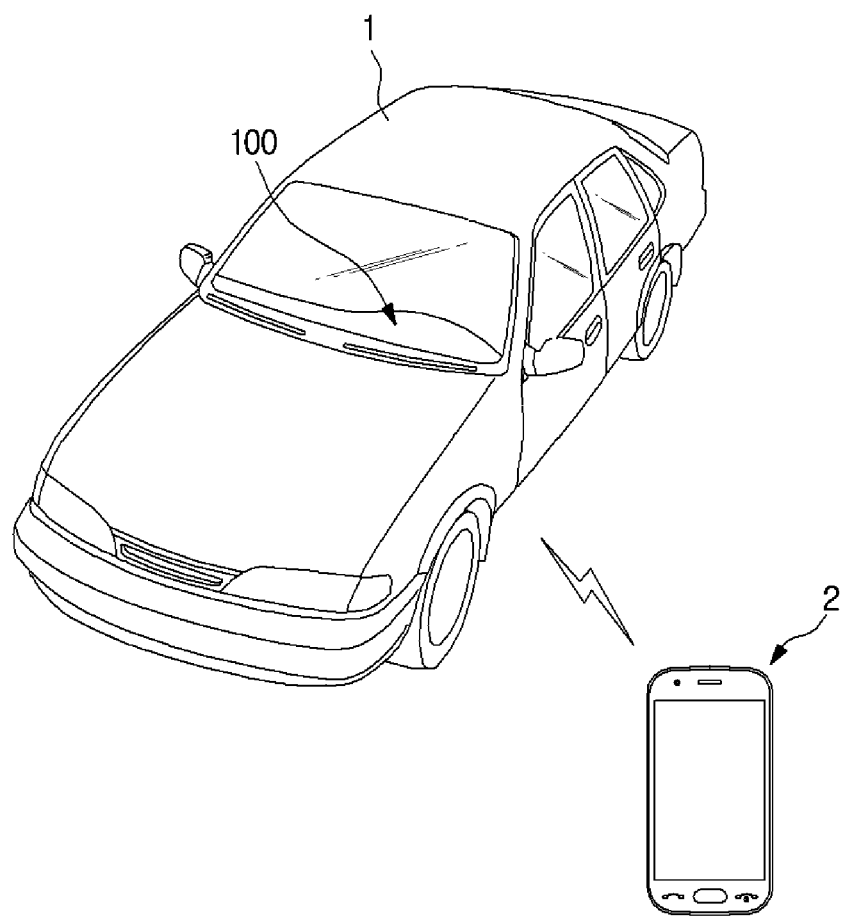
FIG. 1 illustrates a vehicle and a terminal of communicating with the vehicle, according to embodiments of the present disclosure.
Figure 2:
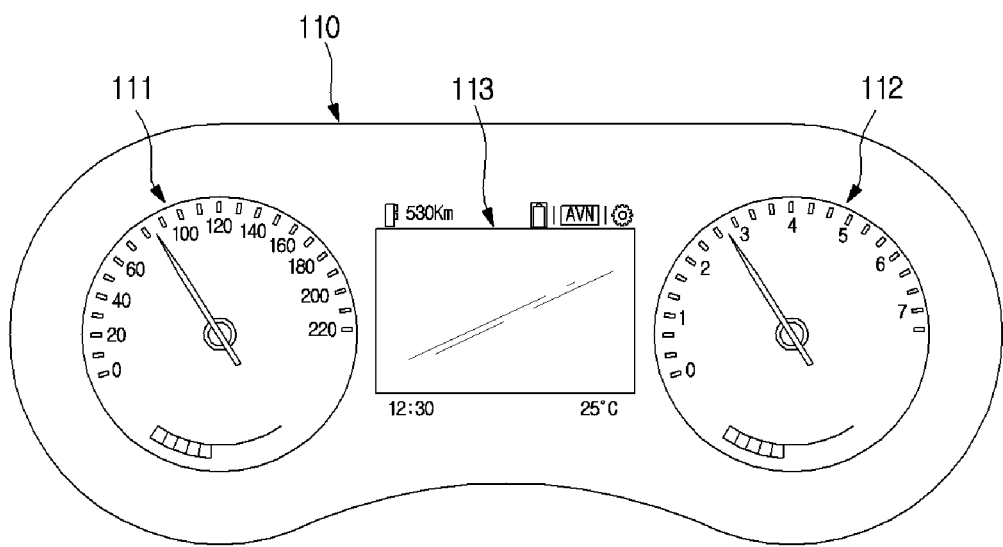
FIG. 2 shows an example of an instrument panel which is a display unit installed in a vehicle according to an embodiment of the present disclosure.
Figure 3:
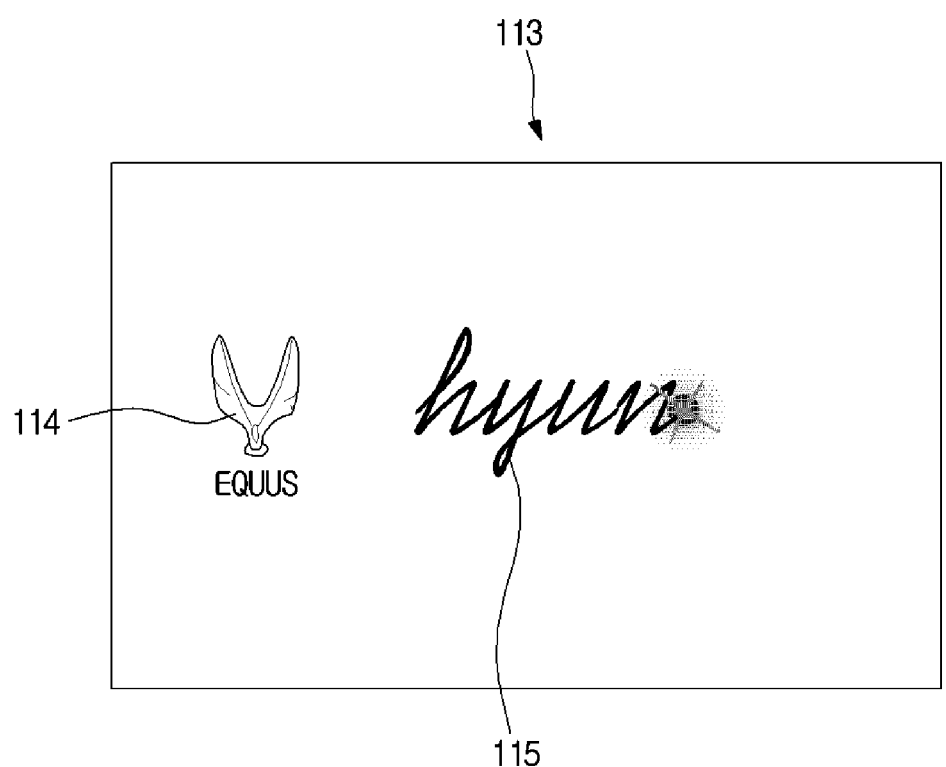
FIG. 3 shows an example of a display on an instrument panel which is a display unit installed in a vehicle according to an embodiment of the present disclosure.

FIG. 1 illustrates a vehicle 1 according to an embodiment of the present disclosure, and a terminal 2 of communicating with the vehicle 1, FIG. 2 shows an example of a display unit 110 installed in the vehicle 1 according to an embodiment of the present disclosure, and FIG. 3 shows an example of a display on the display unit 110 installed in the vehicle 1 according to an embodiment of the present disclosure.

The vehicle 1 may include a body having an interior part and an exterior part, and a chassis which is the remaining part except for the body within which a mechanical system required for driving is installed.

As illustrated in FIG. 1, the exterior part of the body may include a front panel, a hood, a loop panel, a rear panel, a trunk, and front, rear, left, and right doors.

Also, the exterior part of the body may further include a plurality of fillers that are provided in borders between the front panel, the hood, the loop panel, the rear panel, the trunk, and the front, rear, left, and right doors. Also, the exterior part of the body may further include a plurality of window glasses installed in the front, rear, left, and right doors, a plurality of quarter window glasses installed between the fillers wherein the quarter window glasses do not open, a rear window glass installed in the back part of the body, and a front window glass installed in the front part of the body.

The exterior part of the body may further include a plurality of side mirrors that provide a driver with rear views.

The interior part of the body may include a plurality of seats in which passengers sit, a dashboard 100, an instrument panel which is installed in the dashboard 100 and output driving-related information, a steering wheel to control direction of the vehicle 1, and a center fascia including an audio system and blades of an air conditioner, wherein the instrument panel may include a speedometer, a fuel gauge, an automatic transmission selection lever lamp, a tachometer, and a tripmeter.

The seats may include a Drivers Seat (DS) in which a driver sits, a Passenger Seat (PS) in which a passenger sits, and a back seat that is provided in the back part inside the vehicle 1.

The instrument panel, which is a display panel implemented in a digital fashion, corresponds to a first display unit 110 of a terminal provided inside the vehicle 1.

As shown in FIG. 2, the instrument panel, that is, the first display unit 110 may display a speedometer 111, a tachometer 112, an information display window 113, time, and a temperature.

The information display window 113 may display information selected by a user, information about communications with the terminal 2, information related to a navigation function, or information related to options.

As shown in FIG. 3, the information display window 113 of the first display unit 110 may display an emblem 114 related to a vehicle model and a vehicle owner's signature 115.

The emblem 114 and the signature 115 may be displayed for a predetermined time period when the ignition is turned on.

The center fascia may be located in the dashboard 100 between the driver's seat and the passengers seat, and include a control panel. The center fascia may include an audio system, a manipulator for manipulating an air conditioner and a heater, a ventilator, and a cigar jack.

The chassis of the vehicle 1 may include a power generation system, a power transfer system, a driving system, a steering system, a brake system, a suspension system, a transmission system, a fuel system, and front, rear, left, and right wheels.

Also, the vehicle 1 may include various safety systems to ensure a driver's and passengers' safety.

The safety systems may include an airbag system to ensure a driver and passengers' safety upon vehicle collision, and an Electronic Stability Control (ESC) system to avoid loss of control of the vehicle 1 when the vehicle 1 accelerates or corners.

Also, the vehicle 1 may further include a proximity sensor to sense an obstacle or another vehicle in the rear or side of the vehicle 1, and a rain sensor to determine whether it rains and to sense an amount of rainfall.

In addition, the vehicle 1 may further include a hands-free system to improve driver convenience, a Global Positioning System (GPS), an audio system, a Bluetooth device, and a rear camera.

The terminal 2 may be a movable device with communication capability, such as a smart phone, a tablet Personnel Computer (PC), a laptop computer, and a stationary type navigation system. The terminal 2 may be provided inside or around the vehicle 1 to communicate with the vehicle 1.

The terminal 2 may include a user interface that enables a user to input/output information, display output information corresponding to input information received through an input unit of the user interface, on an output unit, or control operations of various devices in correspondence to input information.

Also, the terminal 2 may transmit operation commands or output information corresponding to input information, to an external device.

If a signature input mode is selected, the terminal 2 may receive a signature input by a user, and transmit information about the input signature to the vehicle 1 which is an external device.

The vehicle 1 may further include a terminal (not shown), such as an Audio Video Navigation (AVN) system, which is installed in the center fascia corresponding to the center portion of the dashboard 100 and performs an audio play function, a video play function, a navigation function, etc.

The terminal (not shown) may be installed in an embedded fashion or in a stationary fashion.

The navigation function may calculate a current location of the vehicle 1 based on location information provided from a plurality of satellites, and match the current location of the vehicle 1 with a location on a map to display the current location of the vehicle 1 on the map. More specifically, the navigation function may receive information about a destination from a user, search for a route from a current location of the vehicle 1 to the destination based on a route search algorithm, and match the found route with a map to display the route on the map, thereby guiding the user to arrive at the destination along the route.

The terminal such as the AVN system of the vehicle 1 may display an emblem and user identification information.

The user identification information may include a signature, a user's picture, pictures of persons related to the user, an IDentifier (ID), etc.

Also, a device on which an emblem and a signature are displayed may be selected by the user.

Figure 4:
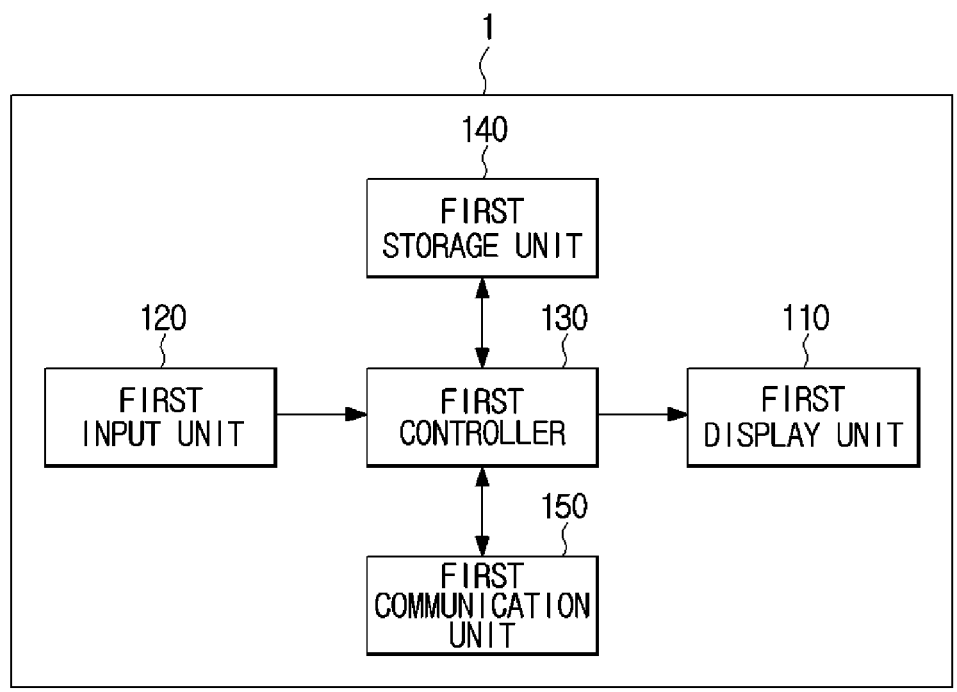
FIG. 4 is a control block diagram of a vehicle according to an embodiment of the present disclosure.

FIG. 4 is a control block diagram of the vehicle 1 according to an embodiment of the present disclosure. Referring to FIG. 4, the vehicle 1 may include the first display unit 110, a first input unit 120, a first controller 130, a first storage unit 140, and a first communication unit 150.

The first display unit 110 may display various information according to a command from the first controller 130, display an emblem and a signature for a predetermined time period when the ignition is turned on, and display information related to driving when a predetermined time period has elapsed from when the emblem and the signature were displayed.

The first display unit 110 may be a display unit of an analog-type instrument panel, a digital-type instrument panel, a display unit of a navigation system, or a window glass on which an image from a Head Up Display (HUD) is projected.

The first input unit 120 may receive information from the user, and transfer the received information to the first controller 130.

The first input unit 120 may receive a command for changing a display mode of the first display unit 110, and receive user identification information such as a signature.

Also, the first input unit 120 may receive commands for registering, changing, deleting, and adding user identification information. That is, the first input unit 120 may receive commands for registering, changing, deleting, and adding a signature.

The first input unit 120 may be separated from the first display unit 110, and extend from one end of an arm rest.

The first input unit 120 may be implemented in the form of a plurality of up, down, left, and right direction buttons, or in the form of a joystick. Also, the first input unit 120 may be implemented in the form of a touch pad.

The first input unit 120 may be a touch pad installed in a navigation system, a touch pad installed in an arm rest, or a touch pad installed in a digital-type instrument panel.

When an ignition signal for starting the vehicle 1 or a turn-on signal for operating the first display unit 110 is received, the first controller 130 may control the first display unit 110 to display an emblem and a signature.

If a command for registering, adding, or changing a signature is received, the first controller 130 may enter a signature input mode, and control the first communication unit 150 to transmit a signal requesting provision of a signature to the terminal 2.

In the signature input mode, the first controller 130 may determine whether signature information is received from the terminal 2. If signature information is received from the terminal 2, the first controller 130 may control storage of the received signature information. At this time, the first controller 130 may control storage of the signature information according to a command for registering, adding, or changing a signature.

If a command for deleting a signature is received, the first controller 130 may control the first display unit 110 to display a signature list stored in the first storage unit 140, and delete a signature selected from the signature list.

If an identification number is received through the first input unit 120, the first controller 130 may search for a signature and driving position information corresponding to the identification number, control the first display unit 110 to display the found signature together with an emblem, and control positions of a seat, a steering wheel, a room mirror, and side mirrors.

The vehicle 1 may further include an Integrated Memory System (IMS) to store information about a driving position that is optimized for a driver and to automatically adjust a driving position based on the information about the driving position when the driver gets in the vehicle 1.

The first storage unit 140 may store pairing information for the terminal 2 in order to receive information on a signature, and may store information on a plurality of registered signatures.

Also, the plurality of signatures stored in the first storage unit 140 may match a plurality of identification numbers, respectively. That is, the first storage unit 140 may store a plurality of signatures that match a plurality of identification numbers, respectively.

Herein, the identification numbers may be used to identify, if there are a plurality of drivers for the vehicle 1, the individual drivers.

The first storage unit 140 may store driving position information including left and right positions, height, and angle of a seat, positions of the rear view mirror and the side mirrors, and a position of the steering wheel, for each identification number.

The first communication unit 150 may communicate with the terminal 2 based on a command from the first controller 130.

That is, the first communication unit 150 may transmit a signal requesting provision of a signature to the terminal 2, and transfer signature information transmitted from the terminal 2 to the first controller 130.

The first communication unit 150 may be a device for wireless communication, such as Bluetooth, Wireless Fidelity (WiFi), Radio Frequency IDentification (RFID), and Near Field Communication (NFC). Also, the first communication unit 150 may be a device for wired communication.

Figure 5:
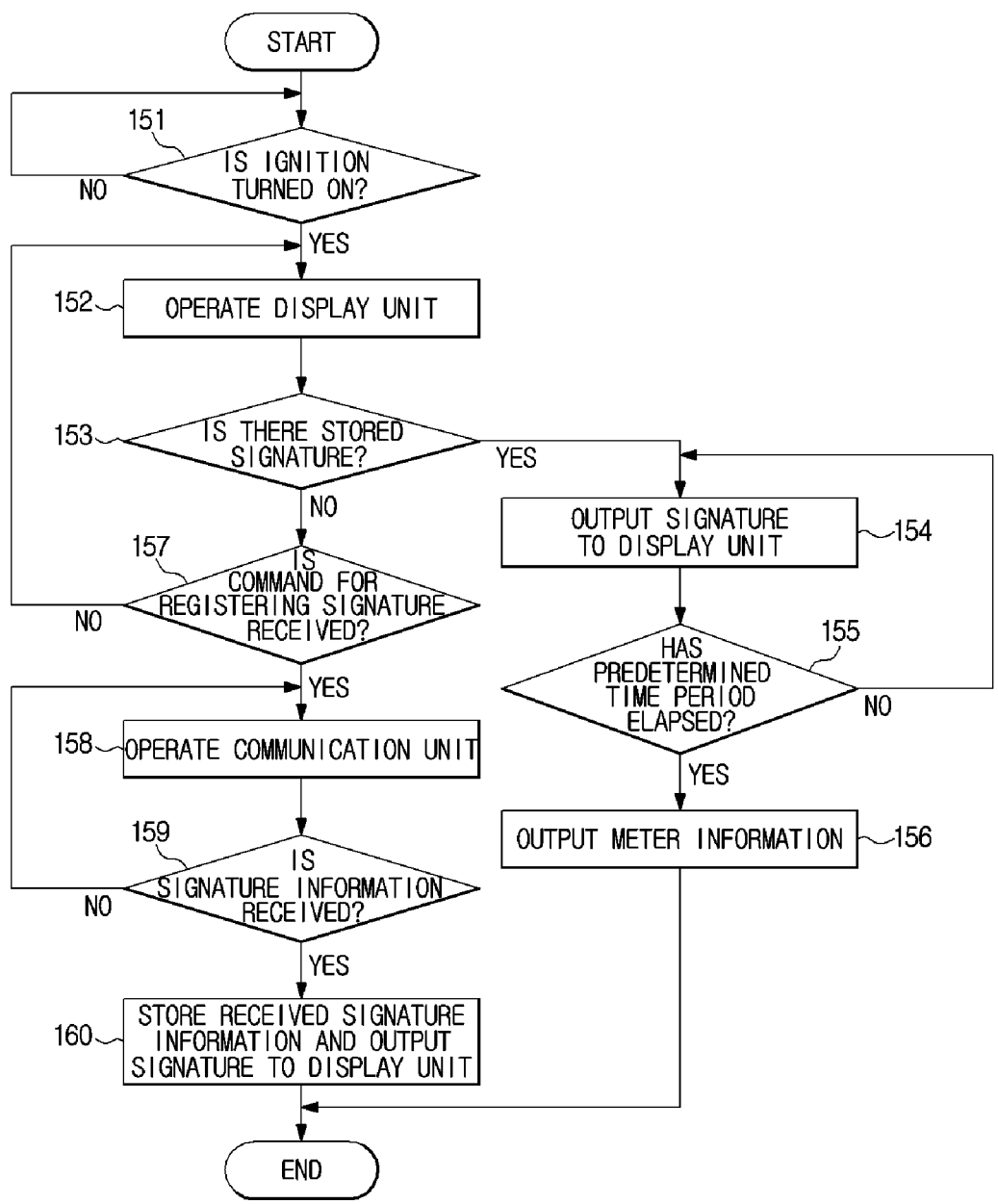
FIG. 5 is a flowchart illustrating a method of controlling a vehicle, according to an embodiment of the present disclosure.

FIG. 5 is a flowchart illustrating a method of controlling the vehicle 1, according to an embodiment of the present disclosure. The method of controlling the vehicle 1, as illustrated in FIG. 5, is a control method of registering and displaying a signature.

Referring to FIGS. 4 and 5, if the ignition is turned on in operation 151, the vehicle 1 may supply power to various devices for driving to operate the devices.

The vehicle 1 may operate an instrument panel or a navigation system.

That is, the vehicle 1 may operate an instrument panel or the first display unit 110 of a navigation system, in operation 152.

If the instrument panel or the navigation system operates, the vehicle 1 may determine whether there is a signature stored in the first storage unit 140, in operation 153. If the vehicle 1 determines that there is a signature stored in the first storage unit 140, the vehicle 1 may output the signature and an emblem to the first display unit 110, in operation 154.

Also, the vehicle 1 may output only the signature to the first display unit 110.

Then, the vehicle 1 may determine whether a time period for which the signature and the emblem are displayed on the first display unit 110 has elapsed by a predetermined time period, in operation 155. If the vehicle 1 determines that the time period for which the signature and the emblem are displayed on the first display unit 110 has elapsed by the predetermined time period, the vehicle 1 may stop outputting the emblem and the signature.

If the first display unit 110 is a digital-type instrument panel, a display unit of an analog-type instrument panel, or a display unit of a HUD, the vehicle 1 may output meter information after stopping outputting of the emblem and the signature, in operation 156.

Also, if the first display unit 110 is a display unit of a navigation system, the vehicle 1 may display a screen for guiding a route, on the first display unit 110, after stopping outputting of the emblem and the signature.

Meanwhile, if the vehicle 1 determines that there is no signature stored in the first storage unit 140, the vehicle 1 may display information to perform the normal function of a device in which the first display unit 110 is installed.

For example, if the first display unit 110 is a digital-type instrument panel, a display unit of an analog-type instrument panel, or a display unit of a HUD, the vehicle 1 may display meter information on the first display unit 110. Also, the vehicle 1 may display only the emblem before displaying meter information.

If the first display unit 110 is a display unit of a navigation system, the vehicle 1 may display a screen for guiding a route, on the first display unit 110.

If the vehicle 1 determines that there is no signature stored in the first storage unit 140, the vehicle 1 may determine whether a command for registering a signature is received through the first input unit 120, in operation 157.

If the vehicle 1 determines that a command for registering a signature is received through the first input unit 120, the vehicle 1 may enter a signature input mode, and control the first communication unit 150 to transmit a signal requesting provision of a signature to the terminal 2 (see FIG. 1), in operation 158.

Thereafter, the vehicle 1 may determine whether signature information is received from the terminal 2, in operation 159. If the vehicle 1 determines that signature information is received from the terminal 2, the vehicle 1 may store the received signature information, and output the signature together with the emblem to the first display unit 110, in operation 160.

The emblem may have been stored in advance in the first storage unit 140.

The vehicle 1 may display the signature and the emblem simultaneously, display the signature and the emblem sequentially, or overlay the signature with the emblem.

If the vehicle 1 determines that the time at which the signature is registered is before the vehicle 1 starts driving, the vehicle 1 may display the emblem and the signature for a predetermined time period, and when the predetermined time period has elapsed, the vehicle 1 may stop outputting the emblem and the signature, and output information to perform the normal function of the first display unit 110.

Also, if the vehicle 1 determines that there is no signature stored in the first storage unit 140, the vehicle 1 may maintain the first communication unit 150 in a standby state, and determine whether signature information is received from the terminal 2. If the vehicle 1 determines that signature information is received from the terminal 2, the vehicle 1 may store the received signature information, and output the signature when the ignition is turned on.

Figure 6A:
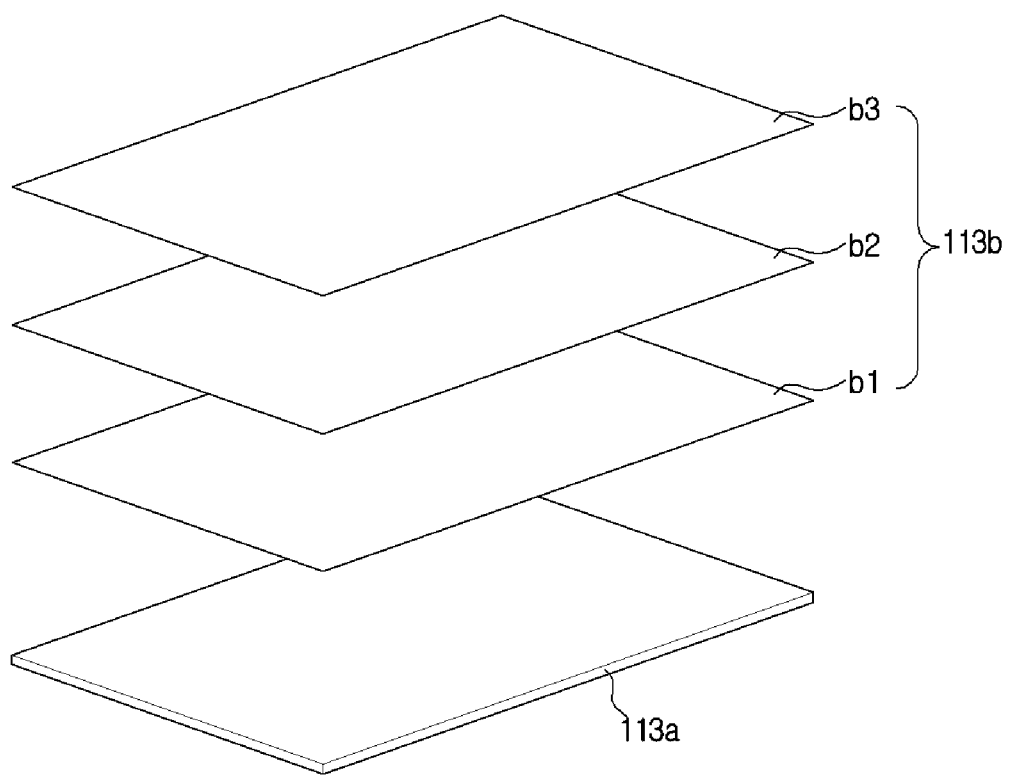
FIGS. 6A, 6B, and 7 are views for describing an example of a display setting for a display unit installed in a vehicle according to an embodiment of the present disclosure.

When a signature is registered, the vehicle 1 may change a design of the signature by changing the size and location of the signature. This operation will be described with reference to FIGS. 6A and 6B, below.

As shown in FIGS. 1, 2, 4 and 6A, the information display window 113 of the vehicle 1 may include a display panel 113a, and a plurality of virtual layers 113b (that is, first, second, and third virtual layers b1, b2, and b3) to design an image that is displayed on the display panel 113a.

Figure 6B:
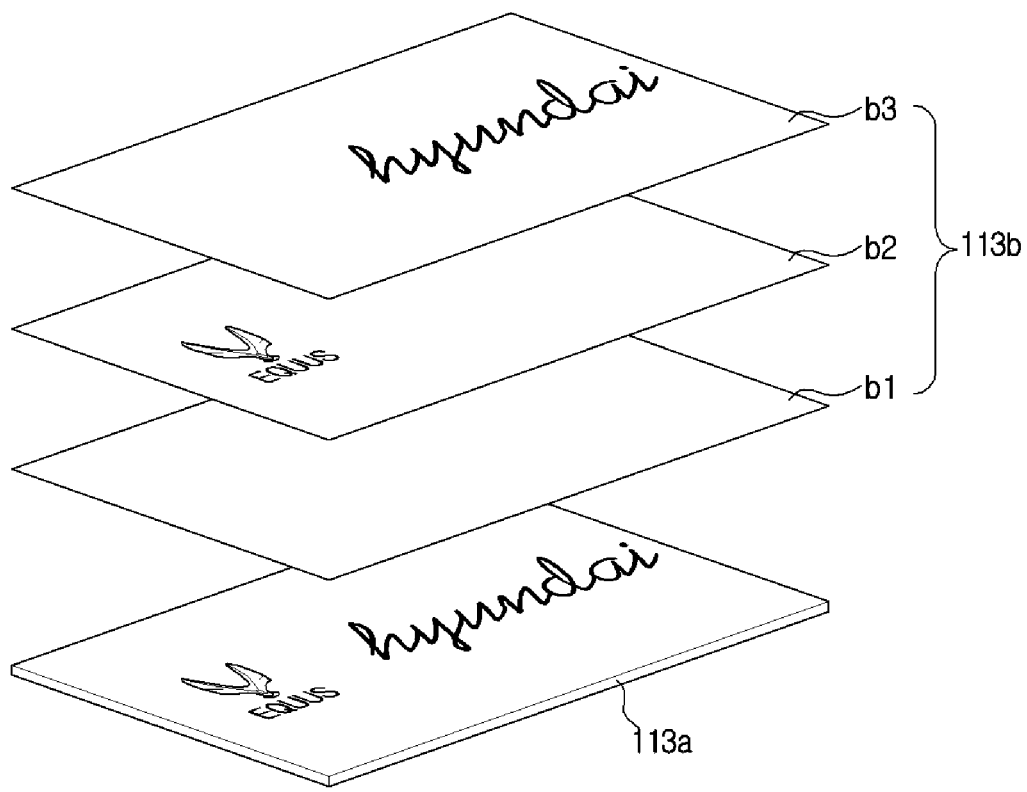

As shown in FIGS. 4 and 6B, the first virtual layer b1 is a layer in which a background image of the information display window 113 is designed, the second virtual layer b2 is a layer in which an emblem is designed, and the third virtual layer b3 is a layer in which a signature is designed.

A plurality of background images may have been stored in advance in the first storage unit 140 so that a user can select a background image from the plurality of background images. Also, a background image may be received from the terminal 2.

The user may select background image changing through the first input unit 120. Then, a background image list including a plurality of background images may be displayed, and the user may select a background image from the background image list through the first input unit 120. The selected background image may be displayed on the first virtual layer b1.

The user may select emblem image changing through the first input unit 120, and then adjust a size and location of an emblem image that is displayed on the second virtual layer b2, through the first input unit 120. The adjusted emblem image may be displayed on the second virtual layer b2.

The user may select signature image changing through the first input unit 120, and then adjust a size and location of a signature image that is displayed on the second virtual layer b2, through the first input unit 120. The adjusted signature image may be displayed on the third virtual layer b3.

The images displayed on the three virtual layers b1, b2, and b3 may be displayed on the display panel 113a.

Also, the vehicle 1 may set times for which a background image, an emblem image, and a signature image are displayed. This operation will be described with reference to FIG. 7, below.

Figure 7:
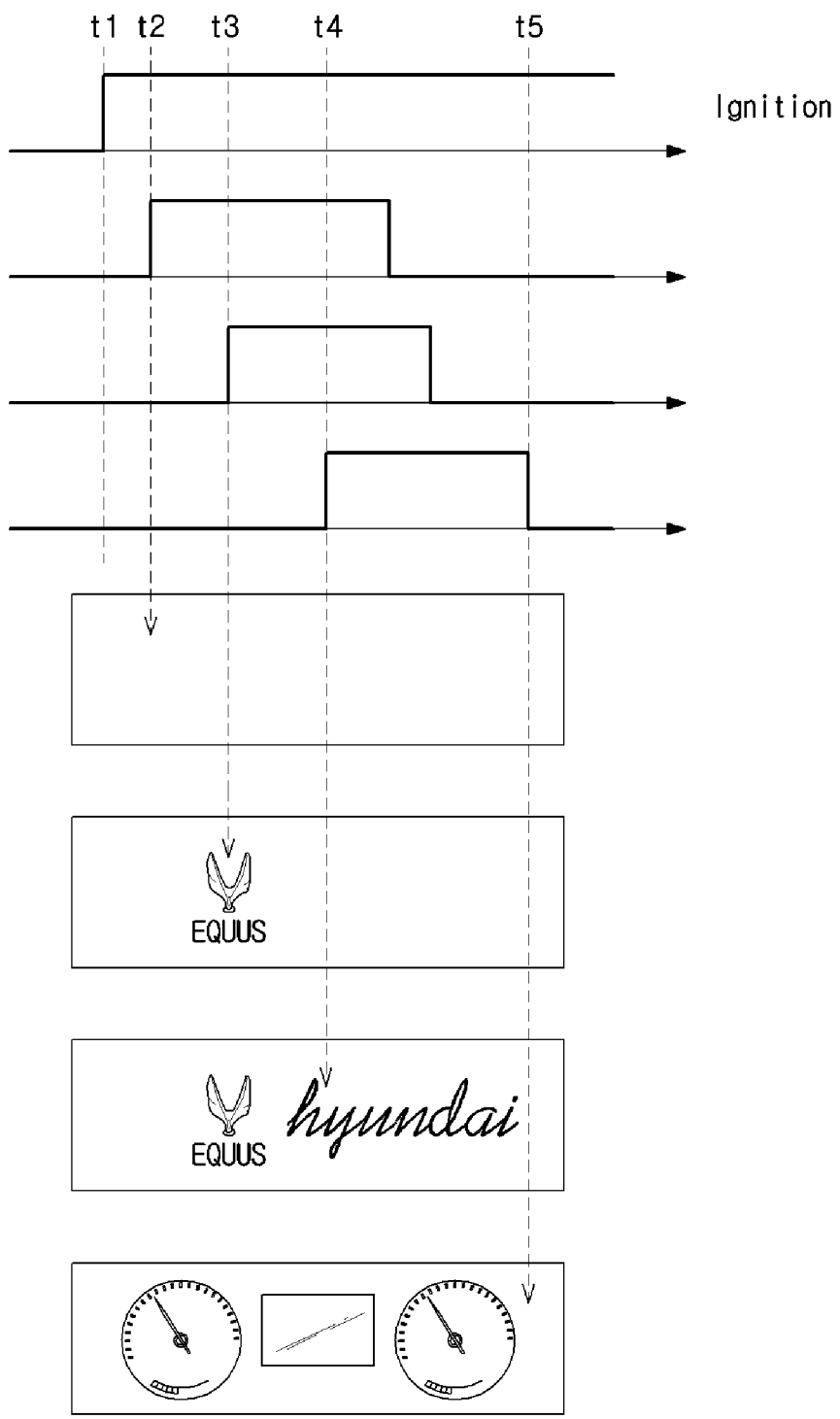

As shown in FIG. 7, at a time t2 at which a first time period has elapsed from a time t1 at which the ignition is turned on, the vehicle 1 may display a background image. Then, at a time t3 at which a second time period has elapsed from the time t2 at which the background image is displayed, the vehicle 1 may display an emblem image. At a time t4 at which a third time period has elapsed from the time t3 at which the emblem image is displayed, the vehicle 1 may display a signature image. At a time t5 at which a fourth time period has elapsed from the time t4 at which the signature image is displayed, the vehicle 1 may stop displaying the background image, the emblem image, and the signature image. When a fifth time period has elapsed from the time t5 at which the background image, the emblem image, and the signature image are no longer displayed, the vehicle 1 may display meter information.

The first to fifth time periods may be set by the user by manipulating the first input unit 120, and an order in which the background image, the emblem image, and the signature image are displayed may also be changed.

Figure 8:
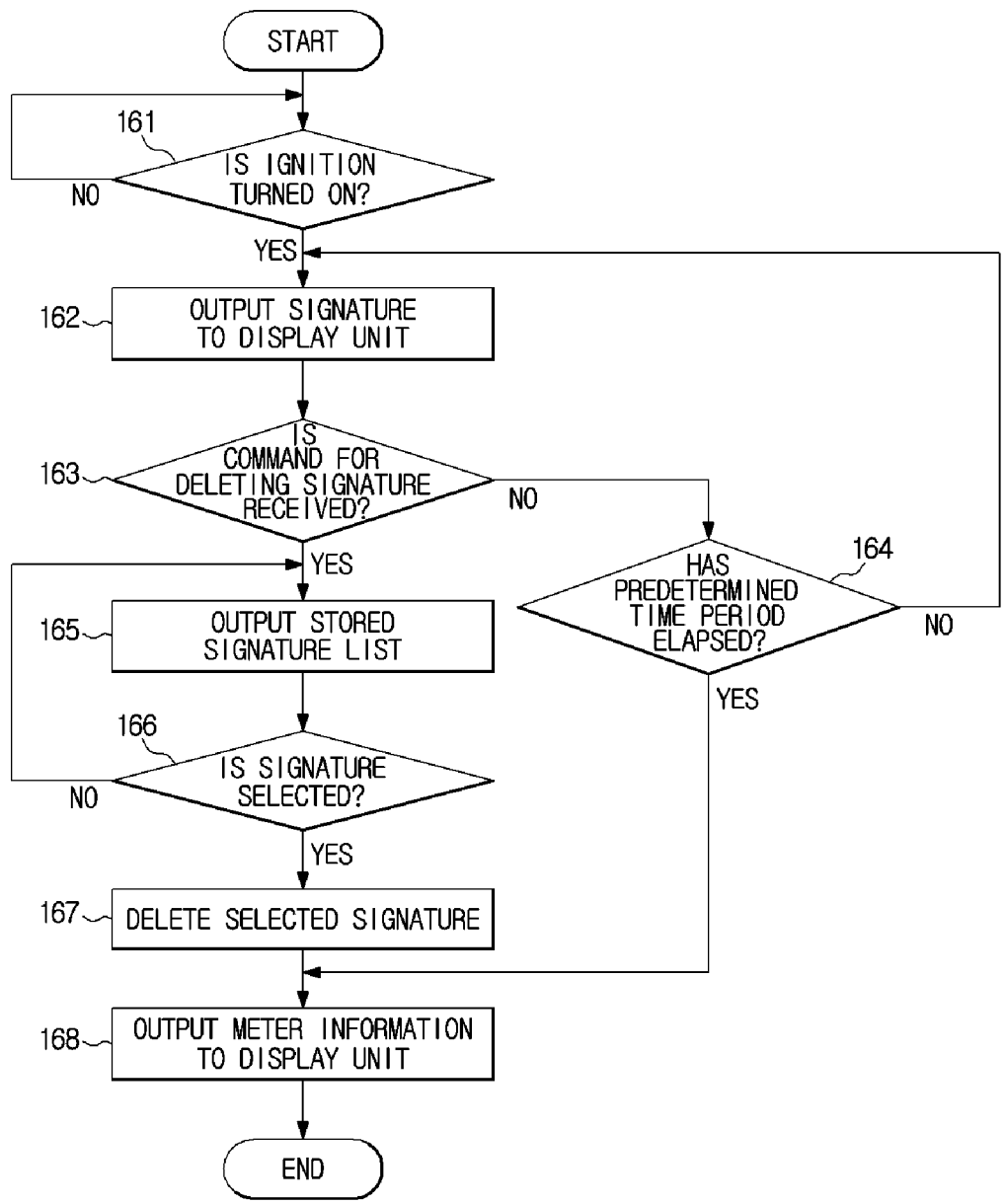
FIGS. 8, 9, and 10 are flowcharts illustrating methods of deleting, changing and adding a signature displayed on a display unit installed in a vehicle, according to embodiments of the present disclosure.

FIG. 8 is a flowchart illustrating a method of controlling the vehicle 1, according to an embodiment of the present disclosure. The method of controlling the vehicle 1, as illustrated in FIG. 8, is for deleting a signature.

Referring to FIGS. 4 and 8, if the ignition is turned on in operation 161, the vehicle 1 may supply power to various devices for driving to operate the devices.

The vehicle 1 may operate an instrument panel or a navigation system.

That is, the vehicle 1 may operate an instrument panel or the first display unit 110 of a navigation system to output a signature to the first display unit 110, in operation 162.

The first display unit 110 may be a digital-type instrument panel, a display unit of an analog-type instrument panel, or a display unit of a HUD or an embedded navigation system.

The vehicle 1 may determine whether a command for deleting a signature is received through the first input unit 120, in operation 163. If the vehicle 1 determines that no command for deleting a signature is received, the vehicle 1 may determine whether a predetermined time period has elapsed from when the signature and the emblem were output, in operation 164, and if the vehicle 1 determines that a predetermined time period has elapsed from when the signature and the emblem were output, the vehicle 1 may stop outputting the signature and the emblem, and output meter information.

Meanwhile, if the vehicle 1 determines that a command for deleting a signature is received through the first input unit 120, the vehicle 1 may output a signature list stored in the first storage unit 140, in operation 165, and determine whether at least one signature is selected from the signature list, in operation 166. If the vehicle 1 determines that at least one signature is selected from the signature list, the vehicle 1 may delete the selected signature from the first storage unit 140, in operation 167.

Then, the vehicle 1 may output information to perform the normal function of the first display unit 110.

For example, if the first display unit 110 is a digital-type instrument panel, a display unit of an analog-type instrument panel, or a display unit of a HUD, the vehicle 1 may display meter information on the first display unit 110, in operation 168. Also, the vehicle 1 may display only the emblem on the first display unit 110 before displaying the meter information.

If the first display unit 110 is a display unit of a navigation system, the vehicle 1 may display a screen for guiding a route, on the first display unit 110.

Figure 9:
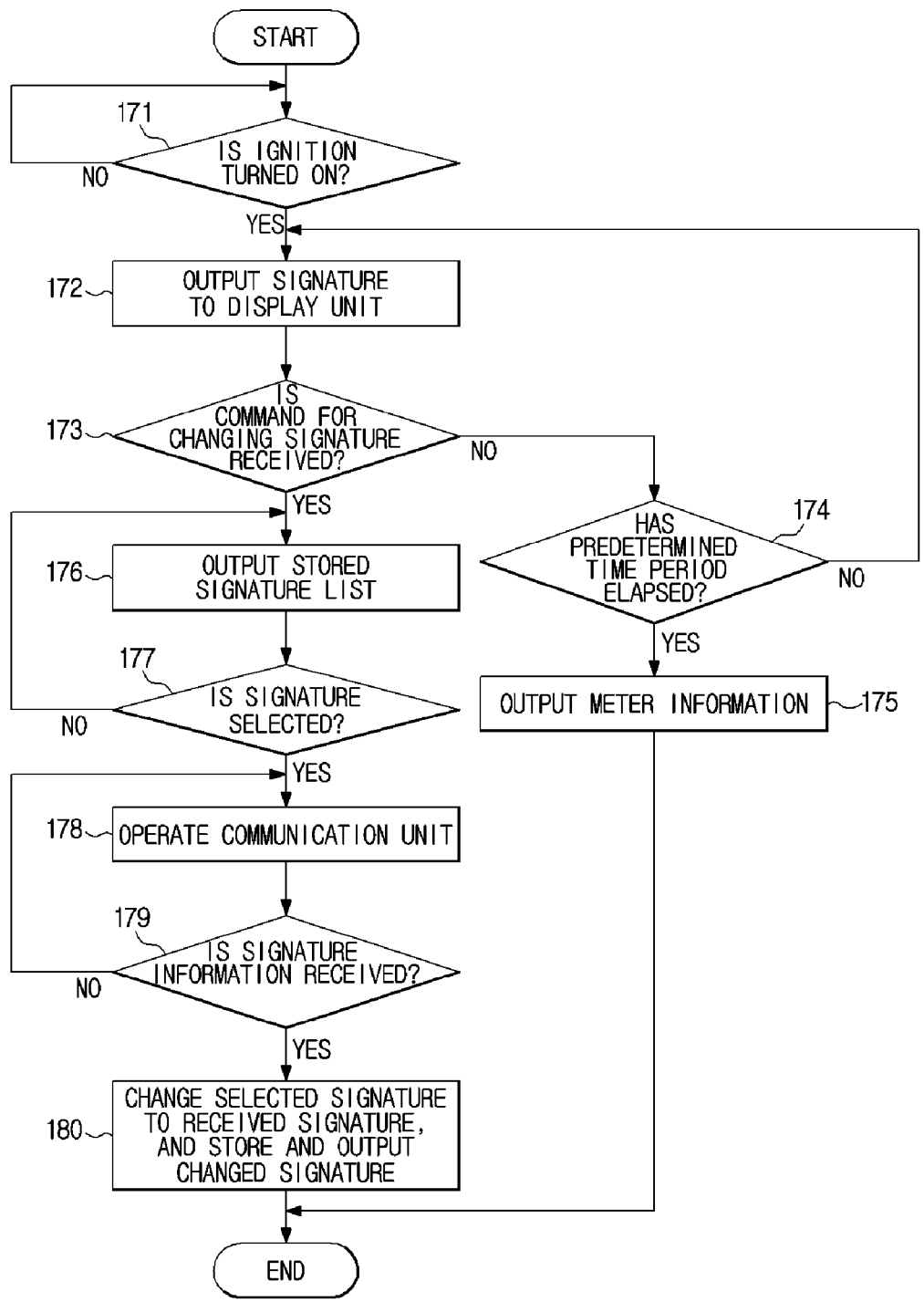

FIG. 9 is a flowchart illustrating a method of controlling the vehicle 1, according to an embodiment of the present disclosure. The method of controlling the vehicle 1, as illustrated in FIG. 9, is a control method of changing a signature.

Referring to FIGS. 4 and 9, if the ignition is turned on in operation 171, the vehicle 1 may supply power to various devices for driving to operate the devices.

The vehicle 1 may operate an instrument panel or a navigation system.

That is, the vehicle 1 may operate an instrument panel or the first display unit 110 of a navigation system to output a signature to the first display unit 110, in operation 172.

The first display unit 110 may be a digital-type instrument panel, a display unit of an analog-type instrument panel, or a display unit of a HUD or an embedded navigation system.

Thereafter, the vehicle 1 may determine whether a command for changing a signature is received through the first input unit 120, and if the vehicle 1 determines that no command for changing a signature is received, the vehicle 1 may determine whether a predetermined time period has elapsed from when the signature and the emblem were output, in operation 174. If the vehicle 1 determines that a predetermined time period has elapsed from when the signature and the emblem were output, the vehicle 1 may stop outputting the signature and the emblem, and output meter information, in operation 175.

Meanwhile, if the vehicle 1 determines that a command for changing a signature is received through the first input unit 120, the vehicle 1 may output a signature list stored in the first storage unit 140, in operation 176. Thereafter, the vehicle 1 may determine whether at least one signature is selected from the signature list, in operation 177. If the vehicle 1 determines that at least one signature is selected from the signature list, the vehicle 1 may temporarily store the selected signature as a signature to be changed.

Then, the vehicle 1 may control the first communication unit 150 to transmit a signal requesting provision of a signature to an external terminal, in operation 178.

Thereafter, the vehicle 1 may determine whether signature information is received from the external terminal in operation 179, and if the vehicle 1 determines that signature information is received from the external terminal, the vehicle 1 may store the received signature information, and delete the temporarily stored signature to be changed.

That is, the vehicle 1 may change the selected signature to the received signature, store the changed signature, and output the signature together with the emblem to the first display unit 110, in operation 180.

The emblem may have been stored in advance in the first storage unit 140.

The vehicle 1 may output the emblem and the signature according to an output setting before the signature changes.

The vehicle 1 may change the output setting of the emblem and the signature in response to a design change request from a user.

For example, the vehicle 1 may display the signature and the emblem simultaneously, display the signature and the emblem sequentially, or overlay the signature with the emblem.

Then, if the vehicle 1 determines that the time at which the signature has changed is before the vehicle 1 starts driving, the vehicle 1 may display the emblem and the signature for a predetermined time period, and when the predetermined time period has elapsed, the vehicle 1 may stop outputting the emblem and the signature, and output information to perform the normal function of the first display unit 110.

For example, if the first display unit 110 is a digital-type instrument panel, a display unit of an analog-type instrument panel, or a display unit of a HUD, the vehicle 1 may display meter information on the first display unit 110. Also, the vehicle 1 may display only the emblem before displaying meter information.

Also, if the first display unit 110 is a display unit of a navigation system, the vehicle 1 may display a screen for guiding a route, on the first display unit 110.

Figure 10:
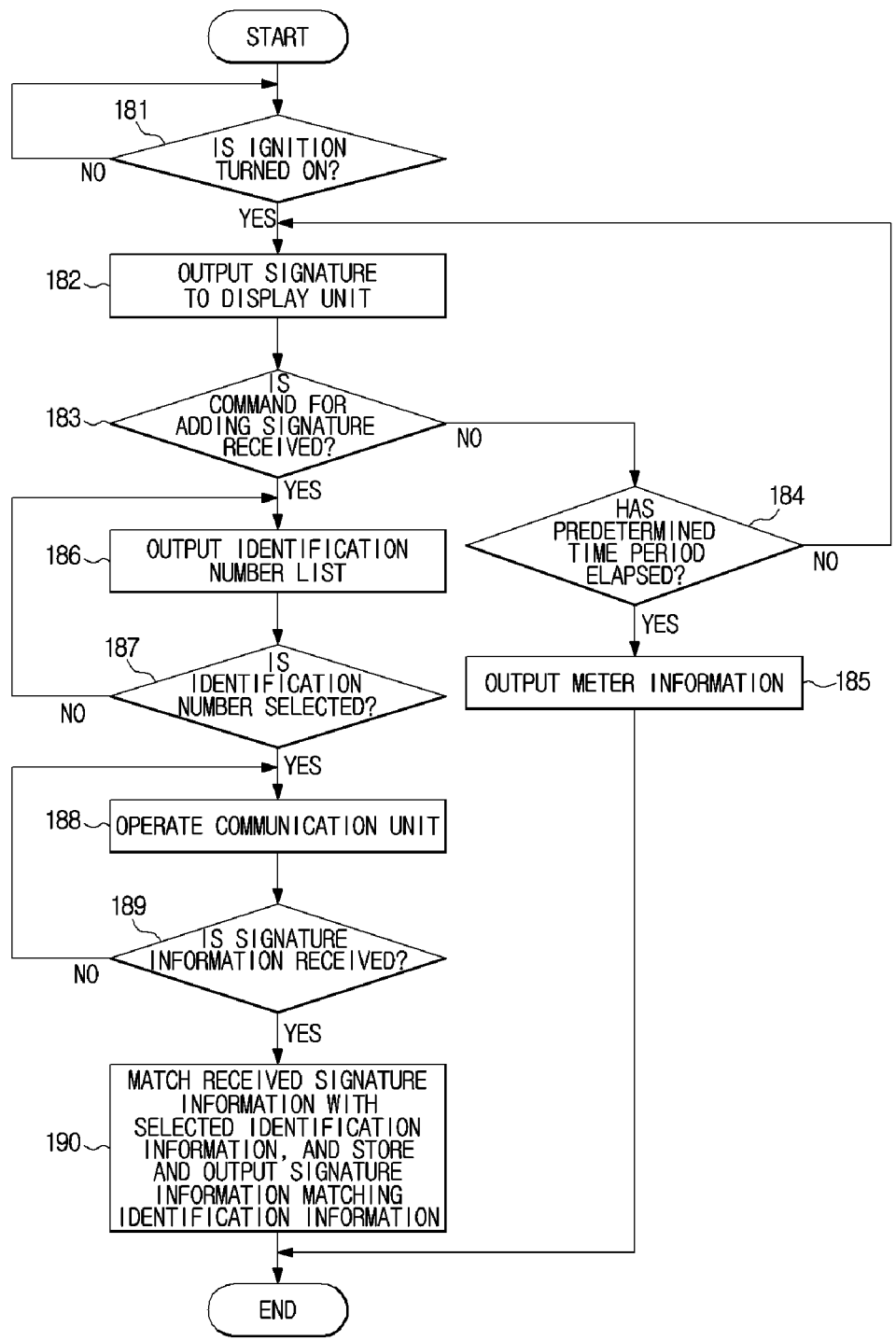

FIG. 10 is a flowchart illustrating a method of controlling the vehicle 1, according to an embodiment of the present disclosure. The method of controlling the vehicle 1, as illustrated in FIG. 10, is a control method of adding a signature.

Referring to FIGS. 4 and 10, if the ignition is turned on in operation 181, the vehicle 1 may supply power to various devices for driving to operate the devices.

The vehicle 1 may operate an instrument panel or a navigation system.

That is, the vehicle 1 may operate an instrument panel or the first display unit 110 of a navigation system to output a signature and an emblem to the first display unit 110, in operation 182.

The first display unit 110 may be a digital-type instrument panel, a display unit of an analog-type instrument panel, or a display unit of a HUD or an embedded navigation system.

Thereafter, the vehicle 1 may determine whether a command for adding a signature is received through the first input unit 120, and if the vehicle 1 determines that no command for adding a signature is received, the vehicle 1 may determine whether a predetermined time period has elapsed from when the signature and the emblem were output, in operation 184. If the vehicle 1 determines that a predetermined time period has elapsed from when the signature and the emblem were output, the vehicle 1 may stop outputting the signature and the emblem, and output meter information, in operation 185.

Meanwhile, if the vehicle 1 determines that a command for adding a signature is received through the first input unit 120, the vehicle 1 may output a signature list stored in the first storage unit 140, in operation 186, wherein the signature list is a list in which a plurality of signatures match a plurality of identification numbers, respectively. In operation 186, the vehicle 1 may output an identification number list in which no signature is designated, together with the signature list in which the signatures match the identification numbers, and determine whether at least one of identification numbers which no signature match is selected, in operation 187. If the vehicle 1 determines that at least one of the identification numbers is selected, the vehicle 1 may temporarily store the selected identification number.

Then, the vehicle 1 may control the first communication unit 150 to transmit a signal requesting provision of a signature to an external terminal, in operation 188.

Thereafter, the vehicle 1 may determine whether signature information is received from the external terminal, in operation 189. If the vehicle 1 determines that signature information is received from the external terminal, the vehicle 1 may match the received signature information with the selected identification information, store the signature information matching the identification information, and output the signature matching the identification information, together with the emblem, to the first display unit 110, in operation 190.

The emblem may have been stored in advance in the first storage unit 110.

Also, the vehicle 1 may output, when adding the signature, the signature together with the identification number so that a user can check the signature.

Thereafter, the vehicle 1 may change an output setting of the emblem and the added signature in response to a design change request from the user.

For example, the vehicle 1 may display the signature and the emblem simultaneously, display the signature and the emblem sequentially, or overlay the signature with the emblem.

If the vehicle 1 determines that the time at which the signature has been added is before the vehicle 1 starts driving, the vehicle 1 may display the emblem and the signature for a predetermined time period, and when the predetermined time period has elapsed, the vehicle 1 may stop outputting the emblem and the signature, and output information to perform the normal function of the first display unit 110.

For example, if the first display unit 110 is a digital-type instrument panel, a display unit of an analog-type instrument panel, or a display unit of a HUD, the vehicle 1 may display meter information on the first display unit 110. Also, the vehicle 1 may display only the emblem before displaying meter information.

Also, if the first display unit 110 is a display unit of a navigation system, the vehicle 1 may display a screen for guiding a route, on the first display unit 110.

If the ignition is turned on after the signature is added, the vehicle 1 may determine whether an identification number is received. If the vehicle 1 determines that an identification number is received, the vehicle 1 may adjust a driving position by adjusting left and right positions, height, and angle of the seat, positions of the room mirror and the side mirrors, and a position of the steering wheel, based on the identification number, and display a signature corresponding to the received identification number together with the emblem.

Figure 11:
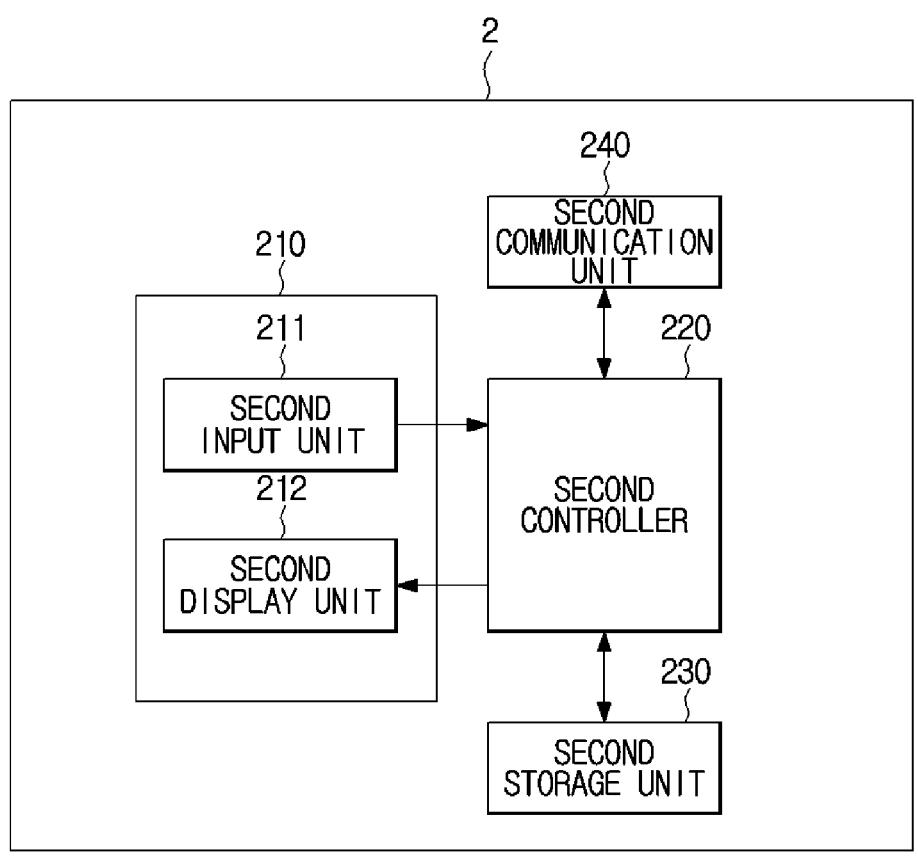
FIG. 11 is a control block diagram of a terminal of communicating with a vehicle, according to an embodiment of the present disclosure.

FIG. 11 is a control block diagram of the terminal 2 of communicating with the vehicle 1, according to an embodiment of the present disclosure. Referring to FIG. 11, the terminal 2 may include a user interface 210, a second controller 220, a second storage unit 230, and a second communication unit 240.

The user interface 210 may receive information from a user, and output information corresponding to the execution results of a program that is executed based on the received information.

The user interface 210 may include an input unit to receive information, and a display unit to output information. The input unit of the terminal 2 may be referred to as a second input unit 211, and the display unit of the terminal 2 may be referred to as a second display unit 212 in order to distinguish the input unit and the display unit of the terminal 2 from the input unit and the display unit of the vehicle 1.

The second input unit 211 may receive a signature input mode, receive information about an input signature and a transmission command, and transfer the information about the input signature to the second controller 220.

The second input unit 211 may include character buttons, such as English characters, Korean characters, numerals, special characters, etc., and receive a signature corresponding to a combination of characters selected by a user.

The second input unit 211 may be a touch pad to receive a signature that is written by a contact of a users finger or an object.

The second display unit 212 may display various information related to operations of the terminal 2.

Also, the second display unit 212 may display a signature input to the second input unit 211.

The second controller 220 may control pairing with the vehicle 1, and if a signal requesting provision of a signature is received from the vehicle 1 with which the terminal 1 has been paired, the second controller 220 may convert a screen of the second display unit 212 to a screen corresponding to a signature input mode in order to receive a signature.

If a signature is input and a completion button is selected, the second controller 220 may control storage of the input signature, and if a transmission button is selected, the second controller 220 may control transmission of information on the stored signature.

Herein, the information about the signature may include an order of strokes in which the signature has been written by a user through the touch pad.

The second storage unit 230 may store information about pairing with the vehicle 1 and the information on the signature.

That is, if the signature is input through character buttons, the second storage unit 230 may store information about a combination of the input characters, and if the signature is input through the touch pad, the second storage unit 230 may store information on a contact location at which the users finger or an object contacts, wherein the contact location may be a contact trajectory that changes over time.

The second communication unit 240 may communicate with the vehicle 1 in a wired/wireless fashion.

The second communication unit 240 may transfer a signal requesting provision of a signature, transmitted from the vehicle 1, to the second controller 220, and transmit stored signature information to the vehicle 1 in response to a command from the second controller 220.

Figure 12:
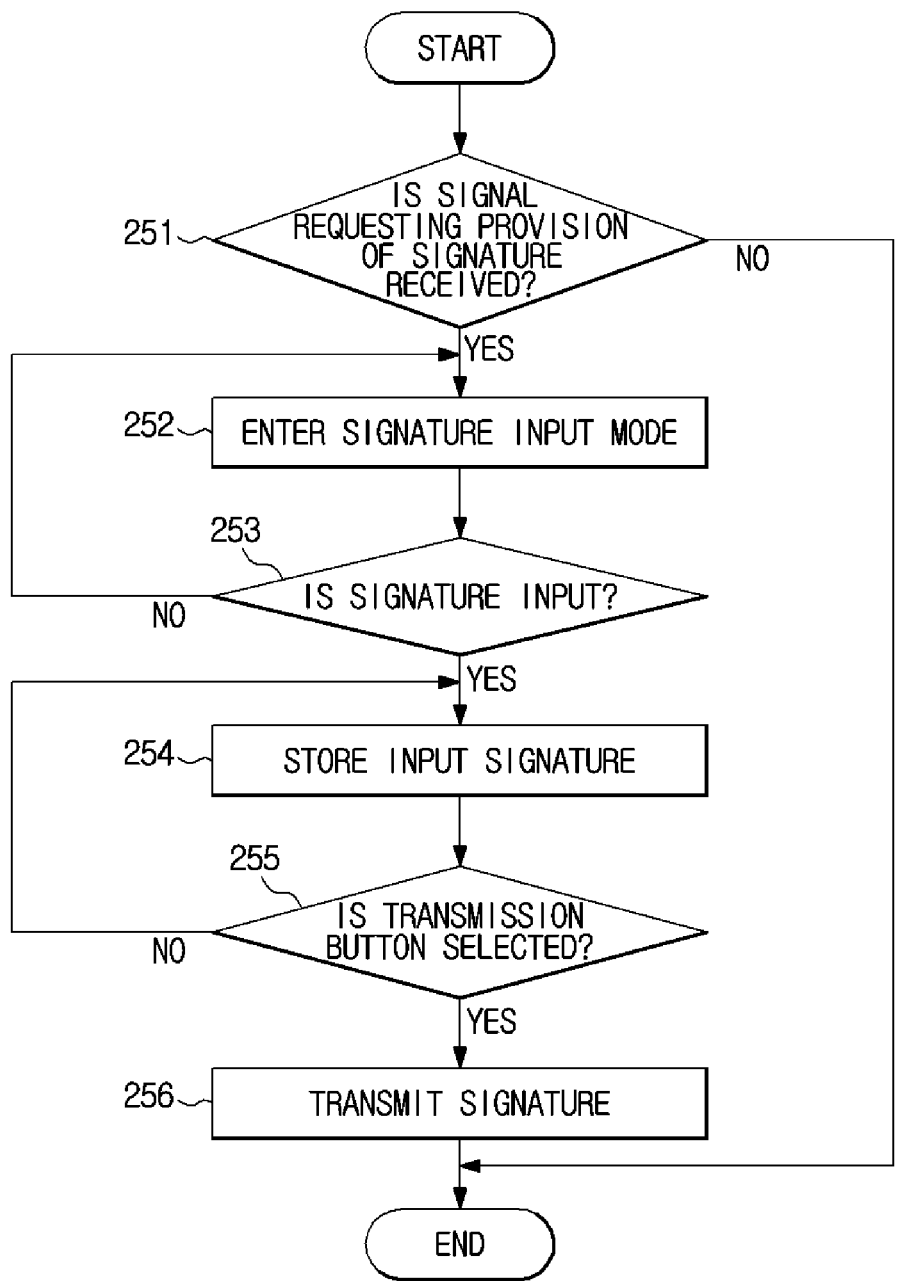
FIG. 12 is a flowchart illustrating a method of controlling a terminal that communicates with a vehicle, according to an embodiment of the present disclosure.

FIG. 12 is a flowchart illustrating a method of controlling the terminal 2 that communicates with the vehicle 1, according to an embodiment of the present disclosure.

Referring to FIGS. 11 and 12, the terminal 2, which is in a standby state or which executes a program, may determine whether a signal requesting provision of a signature is received from the vehicle 1, in operation 251. If the terminal 2 determines that a signal requesting provision of a signature is received from the vehicle 1, the terminal 2 may enter a signature input mode for receiving a signature, in operation 252.

Then, the terminal 2 may determine whether a signature is input through the second input unit 211, in operation 253. If the terminal 2 determines that a signature is input to the second input unit 211, the terminal 2 may store the input signature, in operation 254.

Thereafter, the terminal 2 may determine whether a transmission button is selected through the second input unit 211, in operation 255. If the terminal 2 determines that a transmission button is selected through the second input unit 211, the terminal 2 may communicate with the vehicle 1 to transmit the stored signature to the vehicle 1, in operation 256.

Meanwhile, if a signature transmission command is received through the second input unit 211 although no signal requesting provision of a signature is received from the vehicle 1, the terminal 2 may communicate with the vehicle 1 to transmit a signature stored in the vehicle 1.

Figure 13:
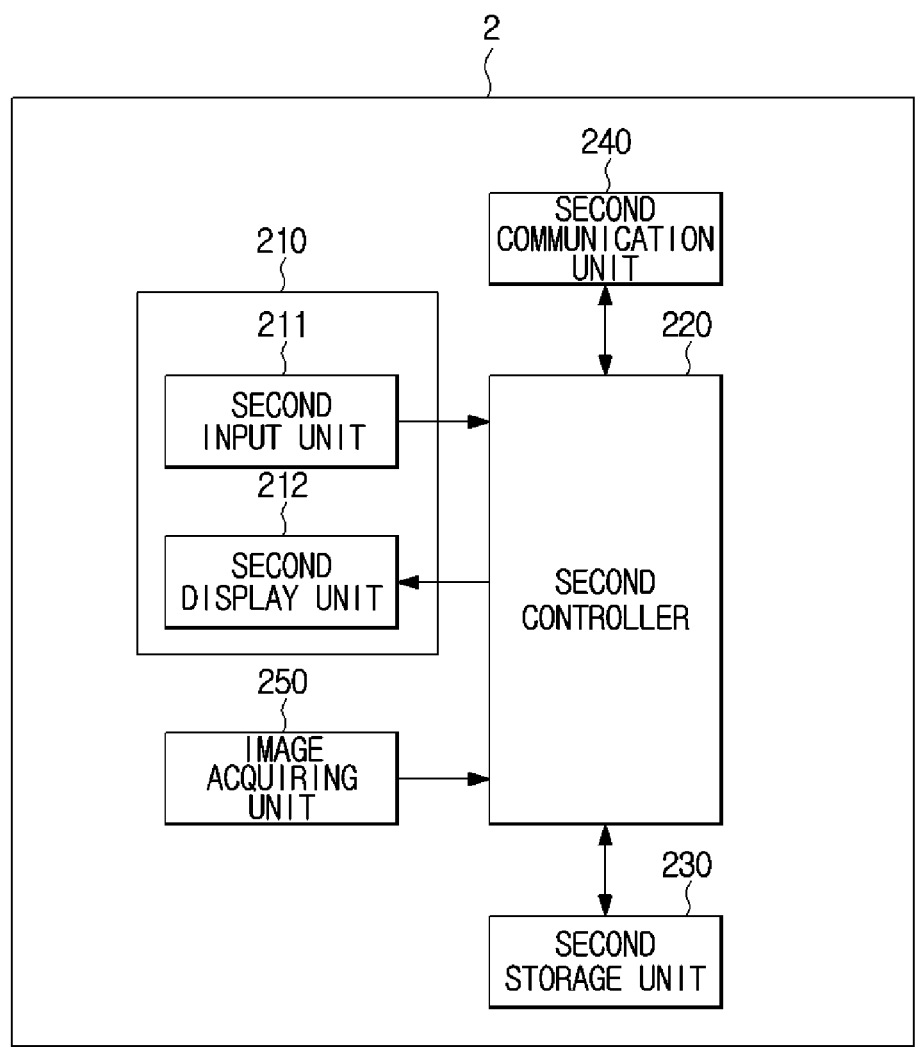
FIG. 13 is a control block diagram of a terminal of communicating with a vehicle, according to another embodiment of the present disclosure.

FIG. 13 is a control block diagram of a terminal 2 of communicating with the vehicle 1, according to another embodiment of the present disclosure. The terminal 2 illustrated in FIG. 13 may further include an image acquiring unit 250, unlike the terminal 2 illustrated in FIG. 11.

The remaining components except for the image acquiring unit 250 are the same as the corresponding ones of FIG. 11, and accordingly, detailed descriptions thereof will be omitted.

The image acquiring unit 250 may acquire an image of a subject, such as a paper on which a signature has been written, and transmit the acquired image to the second controller 220.

The second controller 220 may recognize a signature from the image through image processing, and transmit information about the recognized signature to the vehicle 1.

The second controller 220 may transmit the image acquired by the image acquiring unit 250 to the first controller 130 of the vehicle 1 (see FIG. 4) so that the first controller 130 can recognize the signature through image processing.

That is, the first controller 130 of the vehicle 1 may perform image processing on the image transmitted from the terminal 2 to recognize the signature, and control storage of the recognized signature.

Figure 14A:
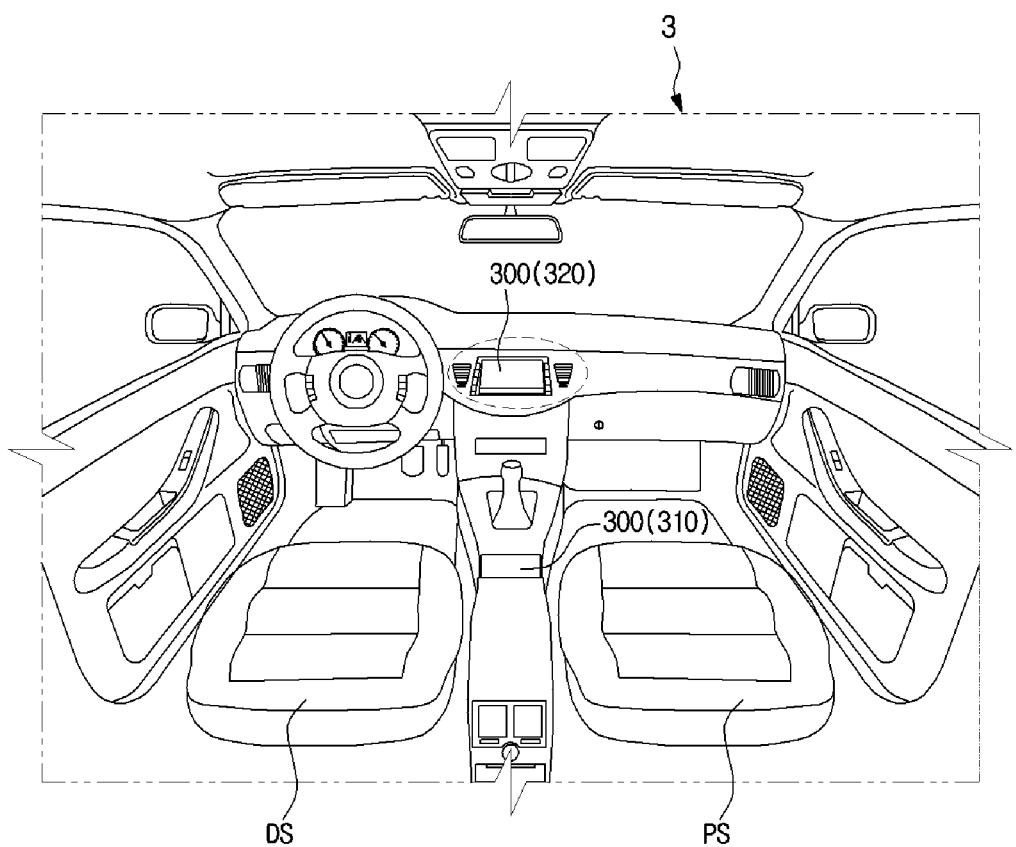
FIG. 14A illustrates external appearance of a terminal installed in a vehicle, according to another embodiment of the present disclosure, when seen from a back seat of the vehicle.
Figure 14B:
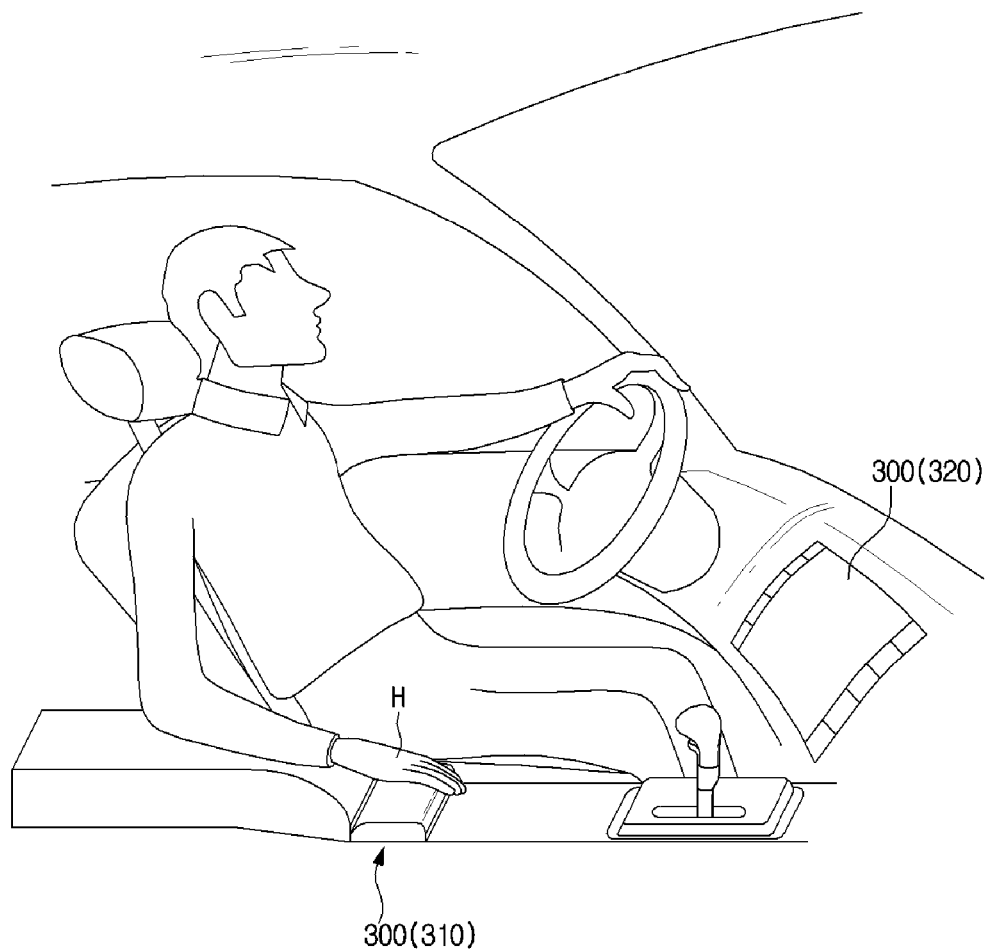
FIG. 14B illustrates external appearance of a terminal installed in a vehicle, according to another embodiment of the present disclosure, when seen from a passenger seat of the vehicle.

FIG. 14A illustrates an external appearance of a terminal installed in a vehicle, according to another embodiment of the present disclosure, when seen from the back seat of the vehicle, and FIG. 14B illustrates an external appearance of a terminal installed in a vehicle, according to another embodiment of the present disclosure, when seen from the passenger seat of the vehicle.

As illustrated in FIGS. 14A and 14B, a terminal 300 to output information may be installed in a vehicle 3.

The terminal 300 may be an AVN system that is installed in a center fascia corresponding to the center portion of a dashboard, and that performs an audio play function, a video play function, and a navigation function. Also, the terminal 300 may be a digital-type instrument panel or a HUD.

The terminal 300 may include a user interface to enable a user to input/output information. The terminal 300 may display output information corresponding to input information input through an input unit 310 of the user interface, on a display unit 320. Also, the terminal 300 may control operations of various devices according to input information.

The input unit 210 and the display unit 320 of the terminal 300 may be implemented as a touch screen. That is, the input unit 310 may be a touch pad, and the display unit 320 may be a display panel, such as a Liquid Crystal Display (LCD), a Plasma Display Panel (PDP), and an Organic Light Emitting Diode (OLED). The touch pad and the display panel may be arranged adjacent to each other.

However, as illustrated in FIGS. 14A and 14B, the input unit 310 and the display unit 320 of the terminal 300 may be separated from each other.

In this case, the input unit 310 to receive information may extend from one end of an arm rest, and the display unit 320 to display information may be positioned in the upper part of the dashboard.

Also, the input unit 310 and the display unit 320 of the terminal 300 may be implemented as a touch screen, and positioned on the dashboard. Another input unit which is in the form of one or more buttons or a joystick may be additionally provided on the arm rest.

A user may input information to the input unit 310 with his/her hand H while putting his/her arm on the arm rest. Accordingly, the user can maintain a comfortable position in which his/her hand is put on the arm rest when he/she inputs no operation command.

Meanwhile, the terminal 300 may be installed in an arm rest of the back seat to receive an operation command from a passenger who sits in the back seat.

Also, the vehicle 3 may include a plurality of terminals 300, wherein one of the terminals 300 may be installed in the dashboard, and another one of the terminals 300 may be installed in an arm rest of the back seat. The terminal 300 may be installed in an embedded fashion inside the vehicle 3.

However, the terminal 300 may be separated from the vehicle 3, and selectively located inside the vehicle 3. Also, the terminal 300 can operate independently from the vehicle 3.

Figure 15:
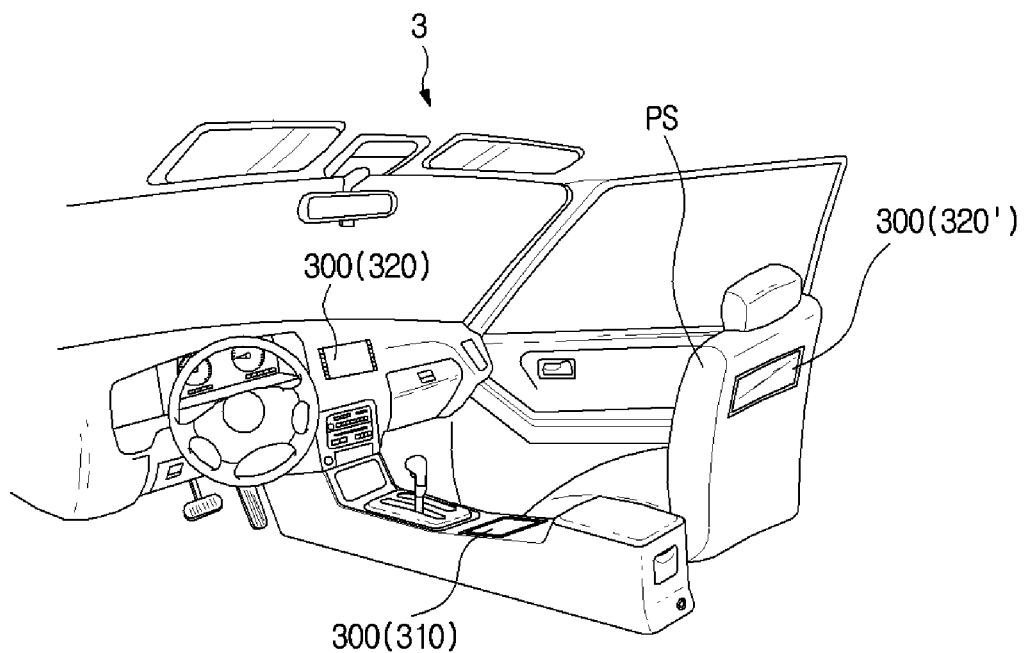
FIG. 15 illustrates a terminal installed in a vehicle, according to another embodiment of the present disclosure.

FIG. 15 illustrates the terminal 300 installed in the vehicle 3, according to another embodiment of the present disclosure;

As illustrated in FIG. 15, the vehicle 3 may further include a display unit 320'.

The vehicle 3 may include a driver seat and a passenger seat that are separated from each other, as front seats, and further include a back seat behind the front seats. Accordingly, when a passenger sits in the back seat, he/she may see the back sides of the front seats.

The display unit 320' may be installed in the back side of the passenger seat.

However, the display unit 320' may be installed in the back side of the driver seat, as well as in the back side of the passenger seat.

The display unit 320' may display the vehicle owners signature when the ignition is turned on according to a command from a controller.

Accordingly, a person who sits in the back seat area of the vehicle 3 can check the signature.

Figure 16:
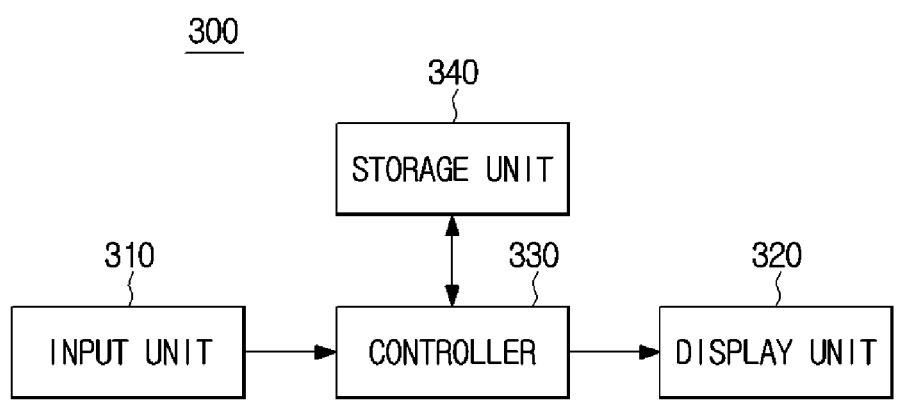
FIG. 16 is a control block diagram of a terminal installed in a vehicle, according to another embodiment of the present disclosure.

FIG. 16 is a control block diagram of the terminal 300 installed in the vehicle 3, according to another embodiment of the present disclosure. Referring to FIG. 16, the terminal 300 may include an input unit 310, a display unit 320, a controller 330, and a storage unit 340.

According to the current embodiment, the terminal 300 may be an AVN system for vehicle.

The input unit 310 may receive an operation command from a user, and transfer input information to the controller 330.

The input unit 310 may receive a command for selecting a menu, and also receive a command for registering, changing, deleting, or adding a signature.

The input unit 310 may be implemented in the form of a plurality of up, down, left, and right direction buttons, or in the form of a joystick. Also, the input unit 310 may be implemented in the form of a touch pad.

That is, the input unit 310 may be one or more buttons or a touch pad integrated into the terminal 300, or the input unit 310 may be a touch pad, one or more buttons, or a joystick installed in an arm rest.

The input unit 310 may detect a location at which a contact of a user's finger or a manipulator such as a stylus pen occurs, and transfer information on the detected contact location to the controller 330.

The display unit 320 may display various information according to a command from the controller 330.

The display unit 320 may be a display unit of an analog-type instrument panel, a digital-type instrument panel, a display unit of a navigation system, or a window glass on which an image from a HUD is projected.

If the ignition is turned on, the display unit 320 may display an emblem and a signature for a predetermined time period. If a predetermined time period has elapsed from when the emblem and the signature were displayed, the display unit 320 may display a menu displaying a list of set functions, or information to perform a navigation function.

FIG. 17 shows examples of menus that are displayed on the display unit 320 of the terminal 300 installed in the vehicle 3, according to another embodiment of the present disclosure.

Figure 17A:
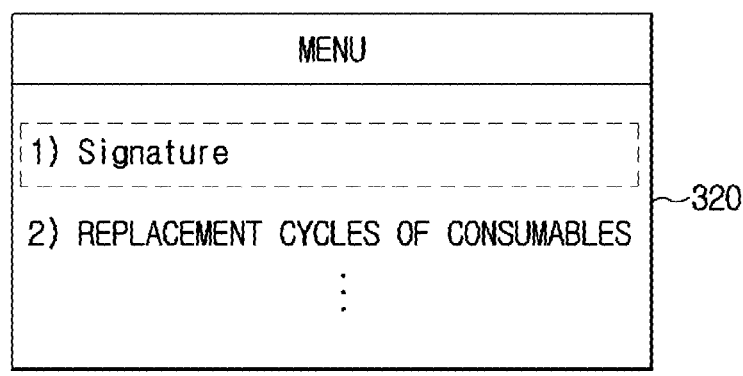
FIGS. 17A and 17B show examples of menus that are displayed on a display unit of a terminal installed in a vehicle, according to another embodiment of the present disclosure.
Figure 17B:
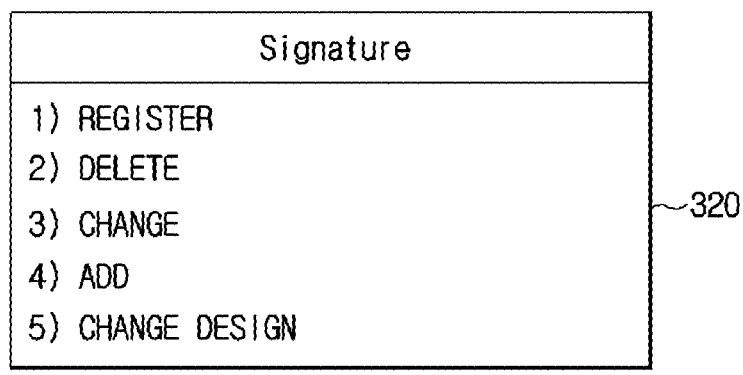

As shown in FIG. 17A, the display unit 320 may display a menu, and if a signature function is selected from the displayed menu, the display unit 320 may display sub menus of the signature function, as shown in FIG. 17B.

The sub menus of the signature function may include a signature registration menu, a signature deletion menu, a signature change menu, a signature addition menu, and a design change menu of changing the design of the display unit 320.

The controller 330 may control overall operations of the terminal 3.

For example, the controller 330 may control operations of a GPS (not shown), the display unit 320, a sound unit (not shown), etc. in order to perform a navigation function, an audio play function, a video play function, etc.

Also, if an ignition signal for starting the vehicle 3 or a turn-on signal for operating the display unit 320 is received, the controller 330 may control the display unit 320 to display an emblem and a signature. Also, the controller 330 may control the display unit 320 to display only a signature.

If a command for registering, changing, or adding a signature is received, the controller 330 may enter a signature input mode, and display a message requesting a user to input a signature through the input unit 310, on the display unit 320.

In the signature input mode, the controller 330 may determine whether a signature is input to the input unit 310, and if the controller 330 determines that a signature is input to the input unit 310, the controller 330 may control storage of information about the input signature, based on a command for registering, adding, or changing a signature.

If a command for deleting a signature is received through the input unit 310, the controller 330 may control the display unit 320 to display a signature list, and delete a signature selected from the signature list.

If an identification number is received through the input unit 310, the controller 330 may search for a signature and driving position information corresponding to the identification number, control the display unit 320 to display the found signature together with an emblem, and control positions of the seat, the steering wheel, the room mirror, and the side mirrors.

That is, the vehicle 3 may further include an IMS to store information about a driving position that is optimized for a driver, and to automatically adjust a driving position based on the information about the driving position when the driver gets in the vehicle 3.

The controller 330 may compare a signature input through the input unit 310 to a signature stored in the storage unit 340 to perform authentication.

In this case, if the controller 330 determines that the input signature is identical to the signature stored in the storage unit 340, the controller 330 may enable the vehicle 3 to drive. If the controller 330 determines that the input signature is not identical to the signature stored in the storage unit 340, the controller 330 may notify the user that the vehicle 3 cannot drive, and also notify the user that internal devices of the vehicle 3 cannot operate.

Also, if the controller 330 determines that the input signature is identical to the signature stored in the storage unit 340, the controller 330 may search for driving position information matching the stored signature, and control positions of the seat, the steering wheel, and the mirrors based on the driving position information.

The storage unit 340 may store information about a plurality of registered signatures.

Also, the plurality of signatures stored in the storage unit 340 may match a plurality of identification numbers, respectively. That is, the storage unit 340 may store a plurality of signatures that match a plurality of identification numbers, respectively.

Herein, the identification numbers may be used to identify, when there are a plurality of drivers for the vehicle 3, the individual drivers.

The storage unit 340 may store driving position information including left and right positions, a height, and an angle of the seat, positions of the room mirror and the side mirrors, and a position of the steering wheel, for each identification number.

Figure 18:
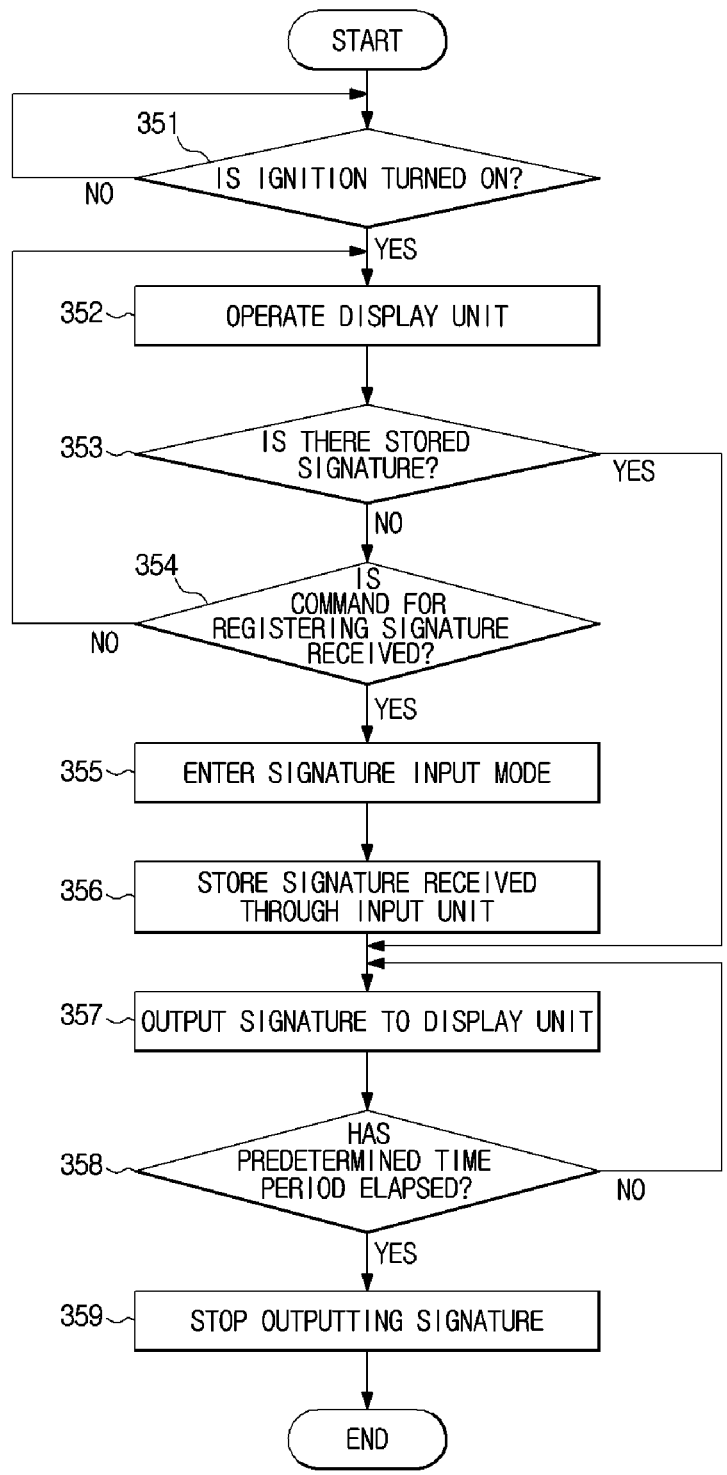
FIGS. 18 and 19A, 19B are flowcharts illustrating methods of controlling a terminal installed in a vehicle, according to other embodiments of the present disclosure.

FIG. 18 is a flowchart illustrating a method of controlling the vehicle 3, according to another embodiment of the present disclosure. The method of controlling the vehicle 3, as illustrated in FIG. 18, is a method of registering and displaying a signature.

Referring to FIGS. 16 and 18, if the ignition is turned on in operation 351, the vehicle 3 may supply power to various devices for driving to operate the devices.

The vehicle 3 may operate an instrument panel or the terminal 300 such as a navigation system.

That is, the vehicle 3 may operate an instrument panel or the display unit 310 of the terminal 300 such as a navigation system, in operation 352.

If the instrument panel or the terminal 300 operates, the vehicle 3 may determine whether there is a signature stored in the storage unit 340, in operation 353, and if the vehicle 3 determines that there is a signature stored in the storage unit 340, the vehicle 3 may output a signature and an emblem to the display unit 320, in operation 357.

Also, the vehicle 3 may output only the signature to the display unit 320.

Then, the vehicle 3 may determine whether a time period for which the signature and the emblem are displayed on the display unit 320 has elapsed by a predetermined time period, in operation 358, and if the vehicle 3 determines that the time period for which the signature and the emblem are displayed on the display unit 320 has elapsed by the predetermined time period, the vehicle 3 may stop outputting the emblem and the signature, in operation 359.

If the display unit 320 is a digital-type instrument panel, a display unit of an analog-type instrument panel, or a window glass, the vehicle 3 may output meter information after stopping outputting of the emblem and the signature.

Also, if the display unit 320 is a display unit of a navigation system, the vehicle 3 may display a screen for guiding a route, on the display unit 320, after stopping outputting of the emblem and the signature.

Meanwhile, if the vehicle 3 determines that there is no signature stored in the storage unit 340, the vehicle 3 may display information to perform the normal function of a device in which the display unit 320 is installed, on the display unit 320.

For example, if the display unit 320 is a digital-type instrument panel, a display unit of an analog-type instrument panel, or a display unit of a window glass, the vehicle 3 may display meter information on the display unit 320. Also, the vehicle 3 may display only the emblem on the display unit 320 before displaying meter information on the display unit 320.

If the display unit 320 is a display unit of a navigations system, the vehicle 3 may display a screen for guiding a route, on the display unit 320.

If the vehicle 3 determines that there is no signature stored in the storage unit 340, the vehicle 3 may determine that a command for registering a signature is received through the input unit 310, in operation 354.

If the vehicle 3 determines that a command for registering a signature is received through the input unit 310, the vehicle 3 may enter a signature input mode, in operation 355, and determine whether a signature is received through the input unit 310.

If the vehicle 3 determines that a signature is received through the input unit 310, the vehicle 3 may acquire information about the received signature, and store the information about the received signature, in operation 356. Then, the vehicle 3 may output the signature together with the emblem to the display unit 320, in operation 357.

The signature may be acquired by causing a user to select one or more characters from among characters displayed on the display unit 320, and combining the characters selected by the user. Also, the signature may be acquired from location information of a contact to a touch pad.

Also, the emblem may have been stored in advance in the storage unit 340.

A plurality of emblem images may be stored in the form of logos and characters, and one of the plurality of emblem images may be selected by a user.

The vehicle 3 may display the signature and the emblem simultaneously, display the signature and the emblem sequentially, or overlay the signature with the emblem.

If the vehicle 3 determines that the time at which the signature has been registered is before the vehicle 3 starts driving, the vehicle 3 may display the emblem and the signature for a predetermined time period on the display unit 320, and the vehicle 3 may determine whether the predetermined time period has elapsed, in operation 358. If the vehicle 3 determines that the predetermined time period has elapsed, the vehicle 3 may stop displaying the emblem and the signature, and output information to perform the normal function of the display unit 320, in operation 359.

Figure 19A:
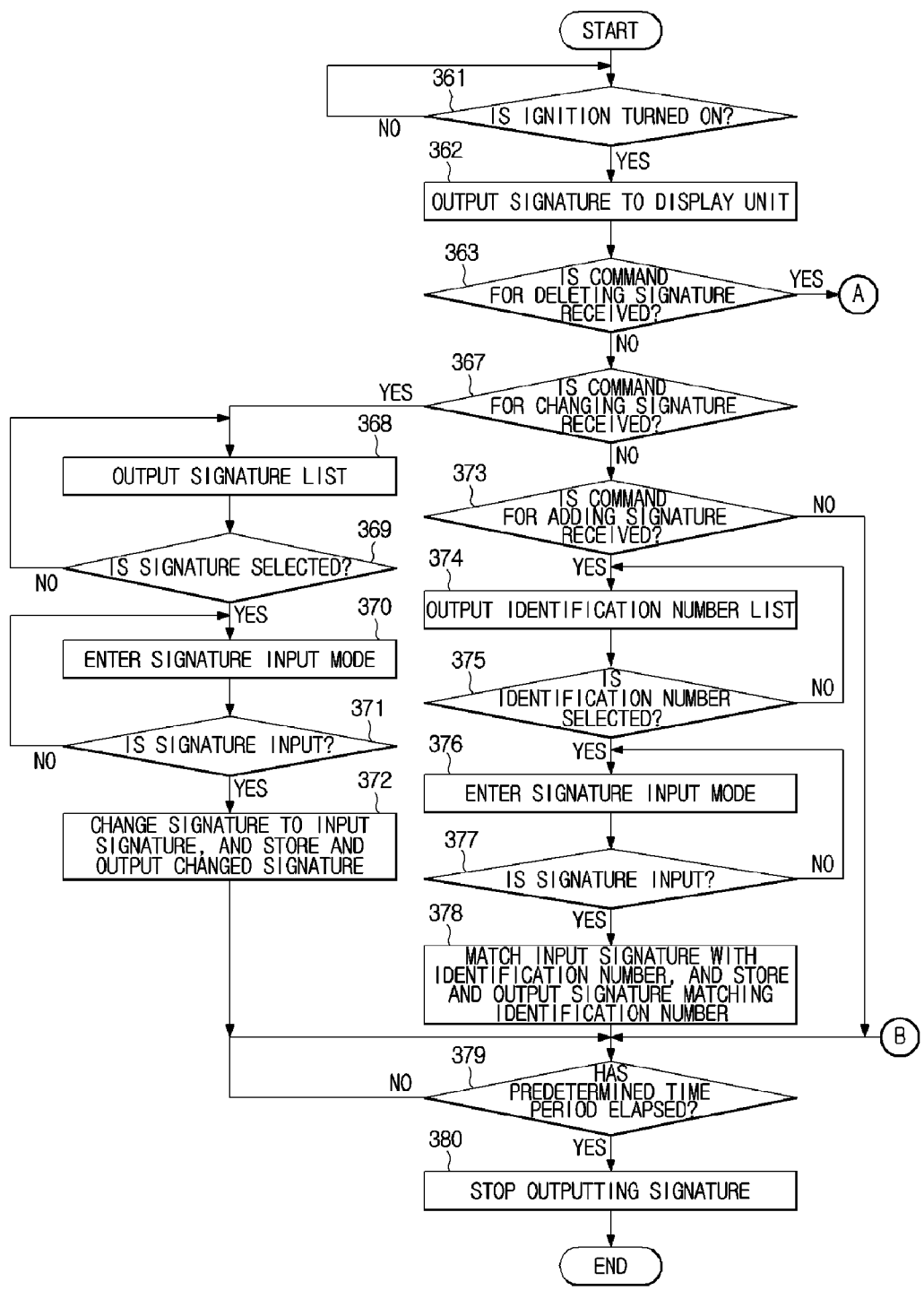
Figure 19B:
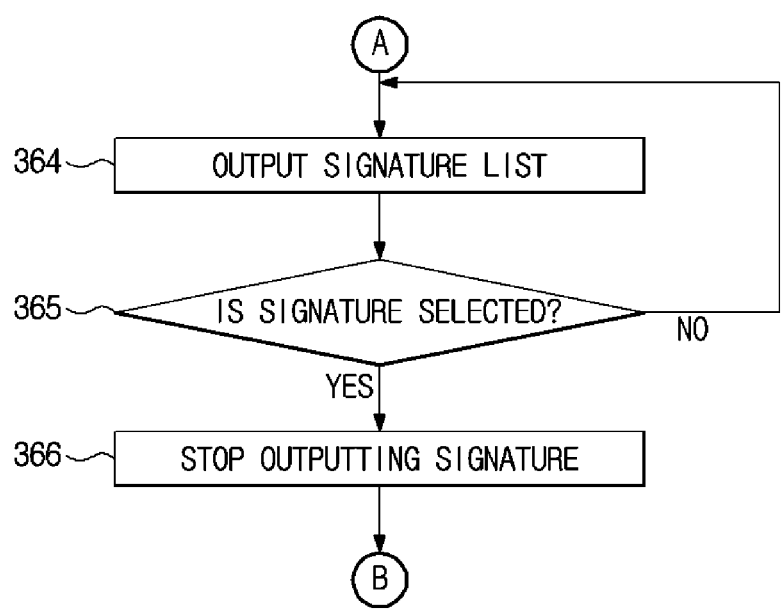

FIG. 19A and FIG. 19B are a flowchart illustrating a method of controlling the vehicle 3, according to another embodiment of the present disclosure. The method of controlling the vehicle 3, as illustrated in FIG. 19A and FIG. 19B, are a method of deleting, changing, or adding a signature.

Referring to FIGS. 16 and 19A and 19B, if the ignition is turned on in operation 361, the vehicle 3 may supply power to various devices for driving to operate the devices.

The vehicle 3 may output a signature and an emblem to an instrument panel or the display unit 320 of a navigation system, in operation 362.

Herein, the display unit 320 may be a digital-type instrument panel, a display unit of an analog-type instrument panel, or a display unit of a HDU or an embedded navigation system.

The vehicle 3 may determine whether a command for deleting a signature is received through the input unit 310, in operation 363. If the vehicle 3 determines that a command for deleting a signature is received through the input unit 310, the vehicle 3 may output a signature list stored in the storage unit 340, in operation 364, and determine whether at least one signature is selected from the signature list, in operation 365. If the vehicle 3 determines that at least one signature is selected from the signature list, the vehicle 3 may delete the selected signature from the storage unit 340, in operation 366.

Meanwhile, if the vehicle 3 determines that no command for deleting a signature is received, the vehicle 3 may determine whether a command for changing a signature is received through the input unit 310, in operation 367. If the vehicle 3 determines that a command for changing a signature is received, the vehicle 3 may output a signature list stored in the storage unit 340, in operation 368, and determine whether a signature is selected from the signature list, in operation 369. If the vehicle 3 determines that a signature is selected from the signature list, the vehicle 3 may temporarily store the selected signature as a signature to be changed.

Then, the vehicle 3 may enter a signature input mode, in operation 370. In the signature input mode, the vehicle 3 may request a user to input a signature to the input unit 310.

Thereafter, the vehicle 3 may determine whether a signature is received through the input unit 310, in operation 371, and if the vehicle 3 determines that a signature is received through the input unit 310, the vehicle 3 may store the received signature, and delete information about the temporarily stored signature.

That is, the vehicle 3 may change the selected signature to be changed to the received signature, register and store the changed signature, and then output the signature to the display unit 320, in operation 372.

Also, if the vehicle 3 determines that a signature is selected from the signature list after the command for changing the signature is received through the input unit 310, the vehicle 3 may temporarily store the selected signature as a signature to be changed, and output another signature list which is user identification information associated with the selected signature.

If the vehicle 3 determines that a signature is selected from the signature list, the vehicle 3 may delete information about the temporarily stored signature, and register and store the selected signature. Then, the vehicle 3 may output the signature together with the emblem to the display unit 320.

For example, it is assumed that "NAME1", "NAME2", and "NAME3" have been stored as signatures that are user identification information of a user 1 in the storage unit 340.

If the signature "NAME1" is selected as a signature to be changed, the vehicle 3 may output "NAME2" and "NAME3" that are other signatures associated with the signature "NAME1" to the display unit 320, and request the user 1 to select one of the signatures "NAME2" and "NAME3". If one of the signatures "NAME2" and "NAME3" is selected through the input unit 310, for example, if the signature "NAME2" is selected, the vehicle 3 may register and store the selected "NAME2" as a new signature.

That is, by registering and storing the signature "NAME", instead of the signature "NAME1", as a signature for the user 1, the signature "NAME2" may be displayed on the display unit 320 when the ignition is turned on.

Requesting the user 1 to select a signature may include outputting a notification message requesting the user 1 to select a signature through the display unit 320 or a sound unit.

If the vehicle 3 determines that no command for changing a signature is received, the vehicle 3 may determine whether a command for adding a signature is received, in operation 373, and output a signature list stored in the storage unit 340, wherein the signature list is a list in which a plurality of signatures match a plurality of identification numbers, respectively.

The vehicle 3 may output an identification number list in which no signature match identification numbers, together with the signature list in which the signatures match the identification numbers, in operation 374, and determine whether one of the identification numbers which no signature matches is selected, in operation 375. If the vehicle 3 determines that one of the identification numbers is selected, the vehicle 3 may temporarily store the selected identification number.

Then, the vehicle 3 may enter the signature input mode, in operation 376. In the signature input mode, the vehicle 3 may request a user to input a signature to the input unit 310, through the display unit 320.

Then, the vehicle 3 may determine whether a signature is received through the input unit 310, in operation 377. If the vehicle 3 determines that a signature is received through the input unit 310, the vehicle 3 may register and store the received signature together with the identification number, and output the stored signature, in operation 378.

Also, when the signature is added, the vehicle 3 may output the signature together with the identification number so that the user can check the signature.

Then, the vehicle 3 may determine whether a predetermined time period has elapsed from when the signature and the emblem were output, in operation 379, and if the vehicle 3 determines that a predetermined time period has elapsed from when the signature and the emblem were output, the vehicle 3 may stop outputting the signature and the emblem, in operation 380.

Meanwhile, if the vehicle 3 determines that no command for adding a signature is received through the input unit 320, the vehicle 3 may determine whether a predetermined time period has elapsed from when the signature and the emblem were output, in operation 379. If the vehicle 3 determines that the predetermined time period has elapsed from when the signature and the emblem were output, the vehicle 3 may stop outputting the signature and the emblem, in operation 380. The emblem may have been stored in advance in the storage unit 340.

Then, if the display unit 320 is a digital-type instrument panel, the vehicle 3 may display meter information, and if the display unit 320 is a display unit of a navigation system, the vehicle 3 may display information to perform a navigation function.

If the ignition is turned on after the signature is added, the vehicle 3 may determine whether an identification number is received, and if the vehicle 3 determines that an identification number is received, the vehicle 3 may adjust a driving position by adjusting left and right positions, a height, and an angle of the seat, positions of the room mirror and the side mirrors, and a position of the steering wheel, based on the identification number, and display a signature corresponding to the identification number, together with the emblem, on the display unit 320.

The vehicle 3 may display the signature and the emblem simultaneously, display the signature and the emblem sequentially, or overlay the signature with the emblem.

The vehicle 3 may change a design of the signature by changing the size and location of the signature based on information input by the user when the signature is registered. This operation will be described with reference to FIG. 20, below.

Figure 20A:
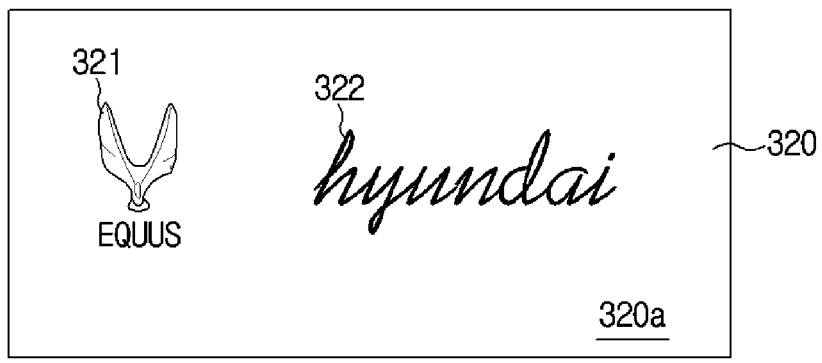
FIGS. 20A, 20B, 20C, and 20D are views for describing examples of display settings for a display unit of a terminal installed in a vehicle, according to another embodiment of the present disclosure.

As shown in FIG. 20A, the display unit 320 may display a background 320a with a plain pattern, display an image of an emblem 321 on the left, and display an image of a signature 322 on the right. However, an arrangement of the background 320a, the image of the emblem 321, and the image of the signature 322 may be set to defaults so that a user can change the locations and sizes of the background 320a, the image of the emblem 321, and the image of the signature 322 from the default settings.

Figure 20B:
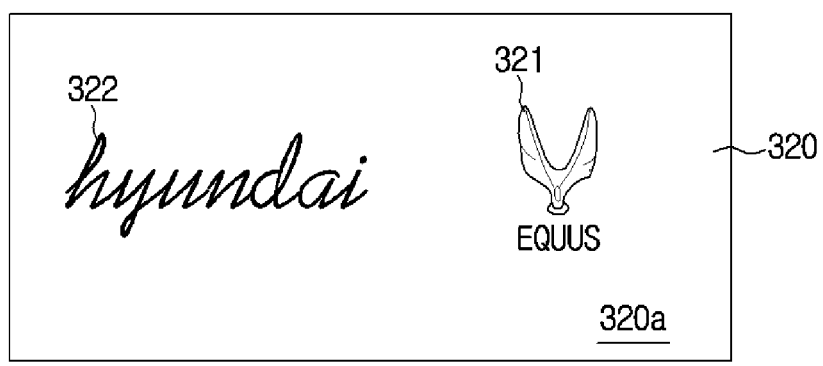

As shown in FIG. 20B, the display unit 320 may display a background 320a with a plain pattern, display an image of a signature 322 on the left, and display an image of an emblem 321 on the right.

Figure 20C:
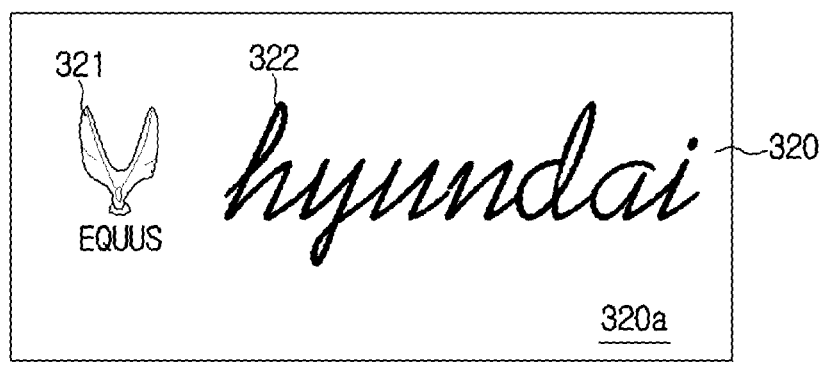

As shown in FIG. 20C, the display unit 320 may display a background 320a with a plain pattern, display an image of an emblem 321 on the left, and display an image of a signature 322 on the right after enlarging the image of the signature 322.

Figure 20D:
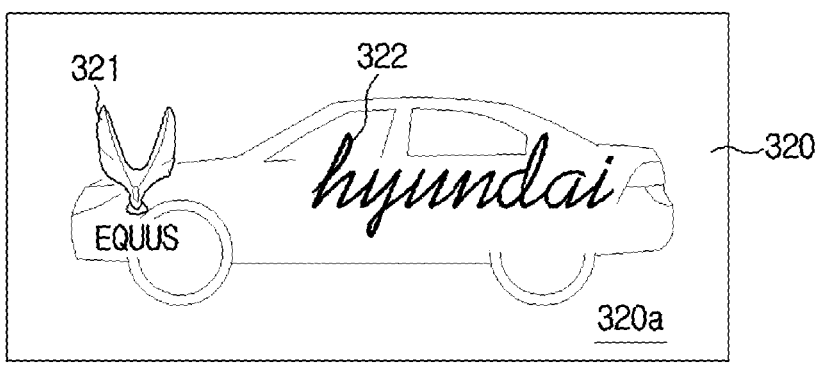

As shown in FIG. 20D, the display unit 320 may display a background 320a with a vehicle image, display an image of an emblem 321 on the left, and display an image of a signature 322 on the right.

Also, the display unit 320 may change an order in which the background image 320a, the image of the emblem 321, and the image of the signature 321 are displayed.

As described above, by displaying user identification information, such as an emblem and a signature, as an intro image, a user can feel a sense of pride and ownership in his/her own vehicle.

Also, a user can develop attachment and high brand loyalty for his/her own vehicle.

In addition, by showing a unique emblem of a vehicle model and a signature sequentially, esthetics can be improved.

In view of marketing, displaying a signature of a customer may arouse a customer purchasing needs, and enhance marketability. Also, by providing an emblem differentiated from those of other vehicle models, it is possible to create an inventive specific brand of an automaker.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
a display unit; and
a storage unit configured to store an emblem and user identification information;
a controller configured to control the display unit to display the emblem and the user identification information sequentially if an ignition is turned on; and
an input unit configured to receive at least one of a difference between a time at which the emblem is displayed and a time at which the user identification information is displayed, information about locations and sizes of the emblem, the user identification information, and the background image of the display unit,
wherein the controller controls the display unit to display based on the received information.

2. The vehicle according to claim 1, further comprising a communication unit configured to communicate with an external terminal,
wherein the controller is configured to receive user identification information transmitted from the external terminal.

3. The vehicle according to claim 1, wherein the user identification information includes at least one of a signature and a picture.

4. The vehicle according to claim 3, further comprising an input unit configured to receive the signature,
wherein the controller registers the signature as user identification information.

5. The vehicle according to claim 4, wherein the input unit comprises a touch pad installed in a navigation system, a digital-type instrument panel, or an arm rest.

6. The vehicle according to claim 4, wherein the input unit comprises a plurality of up, down, left, and right direction buttons, or a joystick, which is installed in an arm rest.

7. The vehicle according to claim 1, further comprising:
an input unit configured to receive an identification number; and
a storage unit configured to store the identification number, and user identification information matching the identification number,
wherein the controller searches for the user identification information matching the identification number, and controls the display unit to display the user identification information.

8. The vehicle according to claim 7, wherein the storage unit stores driving position information matching the identification number, and
wherein the controller is configured to search for the driving position information matching the identification number, and control a position of at least one of a seat, a mirror, and a wheel steering based on the driving position information.

9. The vehicle according to claim 1,
wherein the controller is further configured to change designs of the user identification information and the emblem based on the locations and sizes of the user identification information and the emblem, and store the changed designs of the user identification information and the emblem.

10. The vehicle according to claim 1,
wherein the controller is further configured to control the display unit to display the background image when controlling the display unit to display the user identification information and the emblem.

11. The vehicle according to claim 1, further comprising an input unit configured to receive a command among a command for registering the user identification information, a command for deleting the user identification information, a command for changing the user identification information, and a command for adding the user identification information,
wherein the controller is configured to register, delete, change, or add the user identification information based on a command received through the input unit.

12. The vehicle according to claim 1, wherein the display unit is a digital-type instrument panel, a display unit of an analog-type instrument panel, a window glass installed at a location on which an image from a Head Up Display (HUD) is projected, or a display unit of a navigation system.

13. The vehicle according to claim 1, further comprising a communication unit configured to receive an image,
wherein the controller is configured to perform image processing on the received image to recognize a signature, and register the recognized signature as user identification information.

14. A method of controlling a vehicle with a display unit, comprising:
- determining whether there is stored user identification information if an ignition is turned on;
- displaying, if it is determined that there is stored user identification information, sequentially an emblem and the user identification information on the display unit;
- receiving at least one of a difference between a time at which the emblem is displayed and a time at which the user identification information is displayed, information about locations and sizes of the emblem and the user identification information, and a background image of the display unit, and
- changing designs of the user identification information and the emblem based on the received information,
- storing the changed designs of the user identification information and the emblem.

15. The method according to claim 14, wherein the determining of whether there is the stored user identification information comprises determining whether there is stored user identification information when the ignition is turned on.

16. The method according to claim 14, further comprising:
- communicating with an external terminal; and
- receiving user identification information from the external terminal, and storing the user identification information.

17. The method according to claim 14, further comprising:
- receiving signature information of the user identification information through an input unit; and
- storing the signature information.

18. The method according to claim 14, further comprising:
- receiving an identification number;
- searching for user identification information matching the identification number; and
- displaying the found user identification information.

19. The method according to claim 18, further comprising searching for driving position information matching the identification number, and controlling a position of at least one of a seat, a mirror, and a wheel steering based on the driving position information.

20. The method according to claim 14, further comprising:
- determining whether a command among a command for registering a signature, a command for deleting a signature, a command for changing a signature, and a command for adding a signature is received from the user identification information;
- deleting a signature selected by a user if the received command is a command for deleting a signature, requesting the user to input a signature if the received command is a command for registering a signature, deleting a signature selected by the user and requesting the user to input a signature if the received command is a command for changing a signature, and requesting the user to input a signature and an identification number if the received command is a command for adding a signature;
- registering or changing and storing, if the signature is input, the signature based on the received command; and
- matching, if the signature and the identification number are input, the input signature with the input identification number, and additionally storing the signature matching the identification number.

21. The method according to claim 14, further comprising:
- performing, if an image is received from an external terminal, image processing on the received image to recognize a signature; and
- storing the recognized signature as user identification information.

22. A vehicle having an instrument panel comprising:
- a display unit installed in the instrument panel;
- an input unit configured to receive at least one of information about locations and sizes of user's signature, and a background image of the display unit; and
- a controller configured to control the display unit to display the user's signature and control the display unit to display the meter information when a predetermined time period has elapsed from when the user's signature have been displayed if an ignition is turned on, and controls the display unit to display based on information received through the input unit.

23. The vehicle according to claim 22, wherein the controller is configured to control the display unit to display an emblem if the ignition is turned on, and
the controller is configured to control the display unit to display the user's signature when a predetermined time period has elapsed from when the user's signature and the emblem have been displayed.

24. The vehicle according to claim 22, wherein the controller is further configured to register a signature received from an external terminal.

* * * * *